(12) United States Patent
Ishii

(10) Patent No.: US 8,477,628 B2
(45) Date of Patent: Jul. 2, 2013

(54) BASE STATION AND COMMUNICATION CONTROL METHOD

(75) Inventor: Hiroyuki Ishii, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 230 days.

(21) Appl. No.: 12/933,317

(22) PCT Filed: Mar. 16, 2009

(86) PCT No.: PCT/JP2009/055069
§ 371 (c)(1),
(2), (4) Date: Nov. 2, 2010

(87) PCT Pub. No.: WO2009/116497
PCT Pub. Date: Sep. 24, 2009

(65) Prior Publication Data
US 2011/0038264 A1    Feb. 17, 2011

(30) Foreign Application Priority Data
Mar. 19, 2008    (JP) ................. 2008-071637

(51) Int. Cl.
*H04L 12/26* (2006.01)

(52) U.S. Cl.
USPC ................. 370/238; 370/395.42

(58) Field of Classification Search
USPC ................. 370/238, 329, 395.42, 468
See application file for complete search history.

(56) References Cited

U.S. PATENT DOCUMENTS

| | | | |
|---|---|---|---|
| 6,658,485 B1 * | 12/2003 | Baber et al. | 719/314 |
| 2003/0142658 A1 | 7/2003 | Ofuji et al. | |
| 2003/0193943 A1 * | 10/2003 | Reed et al. | 370/389 |
| 2004/0228355 A1 * | 11/2004 | Parruck et al. | 370/395.42 |
| 2006/0126507 A1 * | 6/2006 | Nakayasu | 370/229 |
| 2006/0209807 A1 * | 9/2006 | Lor et al. | 370/352 |
| 2007/0058649 A1 * | 3/2007 | Kytomaa et al. | 370/412 |
| 2008/0076442 A1 * | 3/2008 | Ishii et al. | 455/453 |

FOREIGN PATENT DOCUMENTS

| | | |
|---|---|---|
| CN | 1436014 A | 8/2003 |
| CN | 1790972 A | 6/2006 |
| JP | 11-017607 A | 1/1999 |
| JP | 2003-229894 A | 8/2003 |
| JP | 2004-135180 A | 4/2004 |

OTHER PUBLICATIONS

International Search Report w/translation from PCT/JP2009/055069 dated Jun. 16, 2009 (4 pages).
3GPP TR 25.814 V7.0.0; "Physical Layer Aspects for Evolved UTRA"; Jun. 2006 (126 pages).
3GPP TS 36.300 V8.2.0; "E-UTRA and E-UTRAN Overall description"; Sep. 2007 (109 pages).

(Continued)

*Primary Examiner* — Brian D Nguyen
(74) *Attorney, Agent, or Firm* — Osha Liang LLP

(57) ABSTRACT

A base station communicating with user equipments using shared channels. The base station includes a congestion level estimation unit estimating a congestion level of a cell; a priority-level/desired-value changing unit changing priority levels or desired minimum transmission rates of data to be transmitted by the user equipments or the base station based on the congestion level of the cell; and a selection unit selecting one or more of the user equipments to which radio resources are to be allocated based on the changed priority levels or the changed desired minimum transmission rates of the data.

6 Claims, 11 Drawing Sheets

OTHER PUBLICATIONS

Written Opinion from PCT/JP2009/055069 dated Jun. 16, 2009 (4 pages).
Office Action in corresponding Chinese Application No. 200980117735.X dated Feb. 20, 2013, with translation (14 pages).
Espacenet Publication Abstract for CN1790972, publication date Jun. 21, 2006 (1 page).
Espacenet Publication Abstract for CN1436014, publication date Aug. 13, 2003 (1 page).

* cited by examiner

FIG.3

| |
|---|
| (FIRST NUMBER OF MOBILE STATIONS) > TH1 |
| (SECOND NUMBER OF MOBILE STATIONS) > TH2 |
| (THIRD NUMBER OF MOBILE STATIONS) > TH3 |
| (FOURTH NUMBER OF MOBILE STATIONS) > TH4 |
| (FIFTH NUMBER OF MOBILE STATIONS) > TH5 |
| (SIXTH NUMBER OF MOBILE STATIONS) > TH6 |
| (SEVENTH NUMBER OF MOBILE STATIONS) > TH7 |
| (EIGHTH NUMBER OF MOBILE STATIONS) > TH8 |
| (NINTH NUMBER OF MOBILE STATIONS) > TH9 |
| (TENTH NUMBER OF MOBILE STATIONS) > TH10 |
| (ELEVENTH NUMBER OF MOBILE STATIONS) > TH11 |
| (PROCESSING LOAD OF BASE STATION) > TH12 |
| (PROCESSING LOAD OF OTHER NODE) > TH13 |

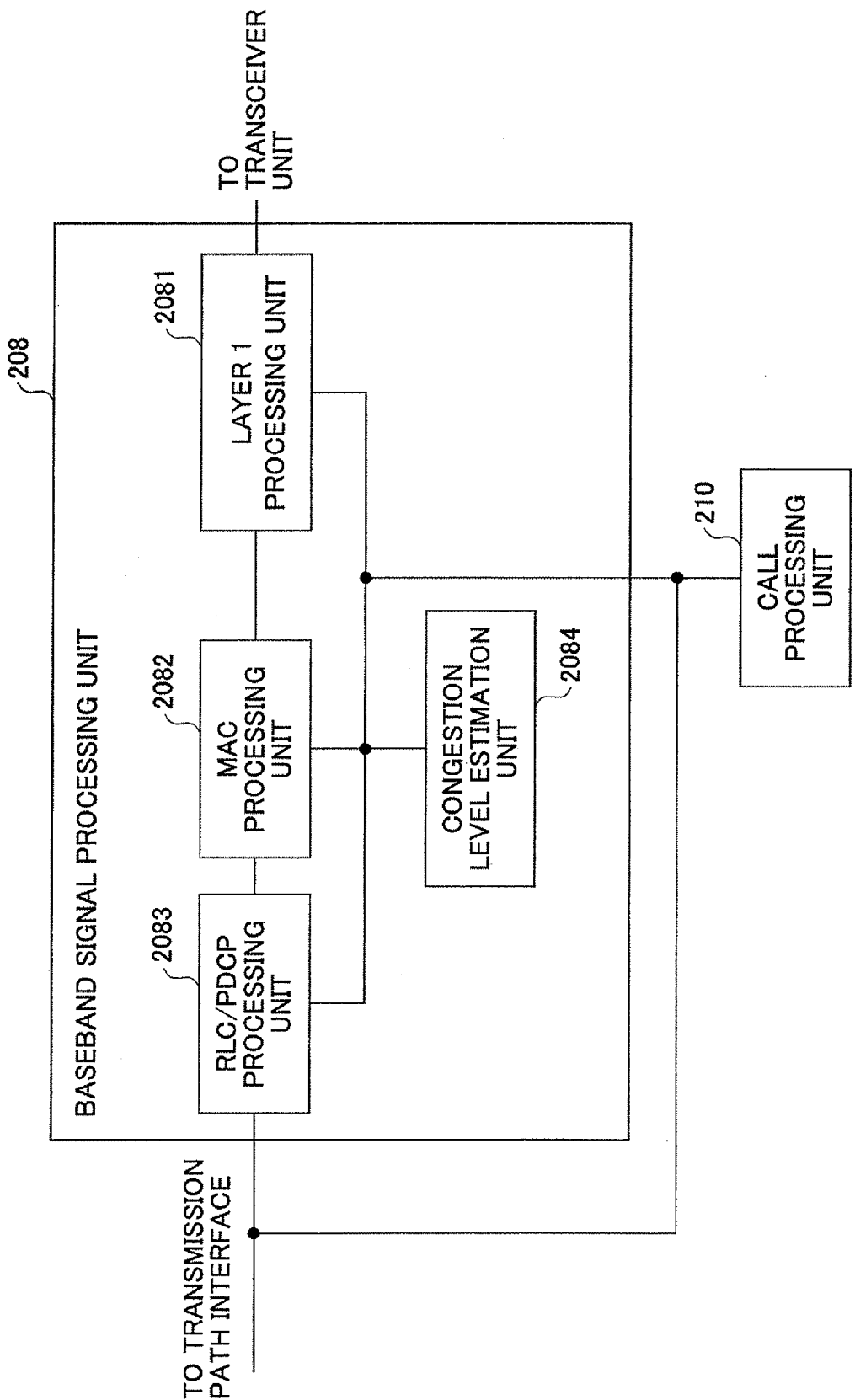

BASE STATION AND COMMUNICATION CONTROL METHOD

TECHNICAL FIELD

The present invention generally relates to a mobile communication system. More particularly, the present invention relates to a base station and a communication control method.

BACKGROUND ART

A successor communication system to wideband code division multiple access (W-CDMA) and high speed downlink packet access (HSDPA), i.e., Long Term Evolution (LTE), is currently being discussed by 3GPP, a standardization group. In LTE, orthogonal frequency division multiple access (OFDMA) is to be used as a downlink radio access method and single-carrier frequency division multiple access (SC-FDMA) is to be used as an uplink radio access method (see, for example, 3GPP TR 25.814 (V7.0.0), "Physical Layer Aspects for Evolved UTRA," June 2006; and 3GPP TS 36.300 (V8.2.0), "E-UTRA and E-UTRAN Overall description," September 2007).

In OFDMA, a frequency band is divided into multiple narrow frequency bands (subcarriers) and data are transmitted on the subcarriers. The subcarriers are densely arranged along the frequency axis such that they partly overlap each other but do not interfere with each other. This method enables high-speed transmission and improves frequency efficiency.

In SC-FDMA, a frequency band is divided into multiple frequency bands and the frequency bands are allocated to different terminals for transmission in order to reduce interference between the terminals. Also, SC-FDMA reduces variation of the transmission power and therefore makes it possible to reduce power consumption of terminals and to achieve wide coverage.

In an LTE communication system, shared channels are used for downlink and uplink.

In downlink, for example, a base station selects, for each subframe (e.g., 1 ms), user equipments allowed to communicate using the shared channel and transmits the shared channel to the selected user equipments. The base station also transmits a downlink control channel in addition to the shared channel to report to the user equipments that the shared channel has been transmitted in the subframe.

In uplink, for example, the base station selects, for each subframe (e.g., 1 ms), user equipments allowed to communicate using the shared channel and transmits a downlink control channel to the selected user equipments to request them to communicate using the shared channel in a specified subframe. The selected user equipments in turn transmit the shared channel based on the downlink control channel. Then, the base station receives and decodes the shared channel transmitted from the user equipments.

A process of selecting user equipments allowed to communicate using the shared channel is called "scheduling".

Popular algorithms for the scheduling include a round robin algorithm and a proportional fairness algorithm.

In the round robin algorithm, radio resources for the shared channel are allocated in rotation to user equipments in a cell.

The proportional fairness algorithm is described below. In the proportional fairness algorithm, for example, a coefficient $C_n$ (n indicates an index of a user equipment) is calculated for each user equipment using formula 1 below, and radio resources for the shared channel are allocated to one or more user equipments whose coefficients $C_n$ are the largest.

$$C_n = \frac{Q_n}{\overline{R}_n} \quad \text{[Formula 1]}$$

$Q_n$: Instantaneous channel quality $\overline{R}_n$: Average transmission rate For downlink, $Q_n$ is calculated, for example, based on a downlink channel quality indicator (CQI) reported by the user equipment. For uplink, $Q_n$ is calculated, for example, based on the radio quality such as the signal-to-interference ratio (SIR) of a reference signal transmitted from the user equipment.

Generally, in a mobile communication system, there are data with a high priority and data with a low priority. For example, a dedicated control channel (DCCH), i.e., C-plane data, has a high priority and a dedicated traffic channel (DTCH) transmitted based on a best-effort service has a low priority. Data of a user subscribing to a high-priced plan have a high priority and data of a user subscribing to a low-priced plan have a low priority. Also, delay-sensitive data such as VoIP data and streaming data have a high priority and packet data transmitted based on a best-effort service have a low priority. To perform scheduling taking into account the priorities as described above, the coefficient $C_n$ may be defined as follows:

$$C_n = A_n \cdot \frac{Q_n}{\overline{R}_n} \quad \text{[Formula 2]}$$

$A_n$: Priority level

Introducing the priority level $A_n$ into the formula for obtaining the coefficient $C_n$ makes it possible to perform scheduling taking into account the priority of data.

DISCLOSURE OF INVENTION

Problems to be Solved by the Invention

Here, if too much weight is placed on the priority of data (or user equipments) in scheduling, radio resources for the shared channel are not allocated to low-priority user equipments and the communication quality of the low-priority user equipments may be greatly reduced. On the other hand, if scheduling is performed without due consideration to the priority of data (or user equipments), radio resources for the shared channel are not appropriately allocated to high-priority user equipments and the communication quality of the high-priority user equipments may be reduced.

Therefore, when performing scheduling taking into account the priority of data, it is necessary to appropriately determine the priority level $A_n$.

Meanwhile, a mobile communication system has a limited amount of resources (e.g., frequency band and electric power) for communications and its channel capacity is limited. Therefore, if the number of users (user equipments) communicating in a mobile communication system increases, the quality of communications being currently performed may be reduced or it may become impossible to start a new communication. Such a situation is called "congestion".

When a mobile communication system is congested, i.e., when the radio resources are tight, it is necessary to place more weight on the priority of data in scheduling. Meanwhile, when a mobile communication system is not congested, i.e., when sufficient radio resources are available, it is preferable to place less weight on the priority of data in scheduling.

If the priority level $A_n$ is determined without taking into account the level of congestion, the communication quality of low-priority or high-priority user equipments may be reduced. For example, if the priority level $A_n$ is always determined based on an assumption that the system is congested, only a small amount of radio resources are allocated to low-priority user equipments even when the system is not congested. On the other hand, if the priority level $A_n$ is always determined based on an assumption that the system is not congested, it is not possible to allocate a sufficient amount of radio resources preferentially to high-priority user equipments when the system is congested.

An aspect of the present invention provides a base station and a communication control method that make it possible to perform scheduling to allocate downlink or uplink radio resources taking into account the level of congestion.

Means for Solving the Problems

An aspect of the present invention provides a base station communicating with user equipments using shared channels. The base station includes a congestion level estimation unit estimating a congestion level of a cell; a priority-level/desired-value changing unit changing priority levels or desired minimum transmission rates of data to be transmitted by the user equipments or the base station based on the congestion level of the cell; and a selection unit selecting one or more of the user equipments to which radio resources are to be allocated based on the changed priority levels or the changed desired minimum transmission rates of the data.

Another aspect of the present invention provides a communication control method performed by a base station communicating with user equipments using shared channels. The method includes the steps of estimating a congestion level of a cell; changing priority levels or desired minimum transmission rates of data to be transmitted by the user equipments or the base station based on the congestion level of the cell; and selecting one or more of the user equipments to which radio resources are to be allocated based on the changed priority levels or the changed desired minimum transmission rates of the data.

Advantageous Effect of the Invention

Embodiments of the present invention provide a base station and a communication control method that make it possible to perform scheduling taking into account the level of congestion.

BRIEF DESCRIPTION OF THE DRAWINGS

FIG. 3 is a table showing 13 determination formulas according to an embodiment of the present invention;

FIG. 4 is a block diagram of a baseband signal processing unit of a base station according to an embodiment of the present invention;

EXPLANATION OF REFERENCES

| | |
|---|---|
| 50 | Cell |
| $100_1, 100_2, 100_3, 100_n$ | Mobile station (user equipment) |
| 200 | Base station |
| 202 | Transceiver antenna |
| 204 | Amplifier |
| 206 | Transceiver unit |
| 208 | Baseband signal processing unit |
| 210 | Call processing unit |
| 212 | Transmission path interface |
| 2081 | Layer 1 processing unit |
| 2082 | MAC processing unit |
| 2083 | RLC/PDCP processing unit |
| 2084 | Congestion level estimation unit |
| 252 | Layer 1 processing unit |
| 254 | User equipment status management unit |
| 256 | Congestion level estimation unit |
| 258 | Priority setting unit |
| 260 | Scheduling coefficient calculation unit |
| 262 | UE selection unit |
| 264 | Frequency resource management unit |
| 268 | TFR selection unit |
| 270 ($270_1, 270_2, \ldots, 270_n$) | HARQ control unit |
| 272 | RLC/PDCP processing unit |
| $2721_{n,k}$ | RLC Buf |
| 280 | UE buffer estimation unit |
| $2801_{n,k}$ | UE Buf |
| 300 | Access gateway |
| 400 | Core network |

BEST MODE FOR CARRYING OUT THE INVENTION

The best mode for carrying out the invention is described based on the following embodiments with reference to the accompanying drawings.

Throughout the accompanying drawings, the same reference numbers are used for parts having the same functions, and overlapping descriptions of those parts are omitted.

Figure 1:
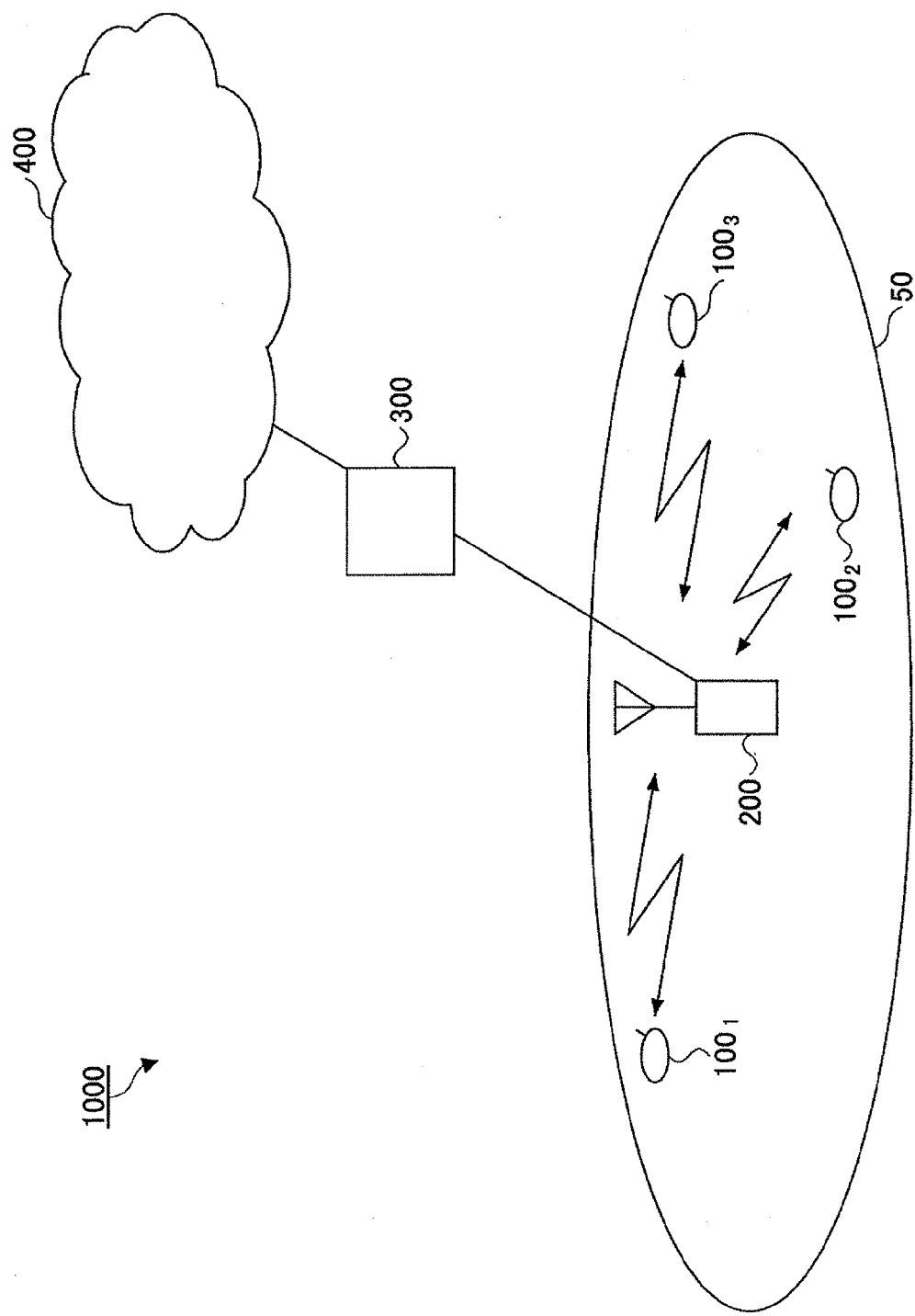
FIG. 1 is a drawing illustrating a configuration of a radio communication system according to an embodiment of the present invention.

A radio communication system 1000 including a base station according to an embodiment of the present invention is described below with reference to FIG. 1.

The radio communication system 1000 is based on, for example, Evolved UTRA and UTRAN (also called Long Term Evolution (LTE) or Super 3G). The radio communication system 1000 includes a base station (eNode B: eNB) 200 and multiple mobile stations (user equipment: UE) $100_n$ ($100_1, 100_2, 100_3, \ldots 100_n$, where n is an integer greater than 0). The base station 200 is connected to an upper node such as an access gateway 300, and the access gateway 300 is connected to a core network 400. The mobile stations 100$_n$ are in a cell 50 and communicate with the base station 200 according to Evolved UTRA and UTRAN. The access gateway 300 may also be called a mobility management entity/serving gateway (MME/SGW).

The mobile stations 100$_n$(100$_1$, 100$_2$, 100$_3$, 100$_n$) have the same configuration and functions and are therefore collectively called the mobile station 100, the mobile station 100$_n$, or the mobile stations 100$_n$ in the descriptions below unless otherwise mentioned.

In the radio communication system 1000, orthogonal frequency division multiple access (OFDMA) is used as the downlink radio access method and single-carrier frequency division multiple access (SC-FDMA) is used as the uplink radio access method. In OFDMA, as described above, a frequency band is divided into narrow frequency bands (subcarriers) and data are transmitted on the subcarriers. In SC-FDMA, a frequency band is divided into multiple frequency bands and the frequency bands are allocated to different terminals for transmission in order to reduce interference between the terminals.

Communication channels used in Evolved UTRA and UTRAN are described below.

For downlink, a physical downlink shared channel (PDSCH) shared by the mobile stations 100$_n$ and a physical downlink control channel (PDCCH) (an LTE downlink control channel) are used. In downlink, the LTE downlink control channel is used to report information on users to be mapped to the physical downlink shared channel, transport format information for the physical downlink shared channel, information on users to be mapped to a physical uplink shared channel, transport format information for the physical uplink shared channel, and acknowledgement information for the physical uplink shared channel; and the physical downlink shared channel is used to transmit user data. The acknowledgement information for the physical uplink shared channel may be transmitted via a physical HARQ indicator channel (PHICH) instead of the LTE downlink control channel. Examples of the user data include IP packets in Web browsing, file transfer (FTP), and voice over IP (VoIP); and a control signal for radio resource control (RRC). The user data are mapped to the physical downlink shared channel (PDSCH) as a physical channel and to a downlink shared channel (DL-SCH) as a transport channel.

For uplink, a physical uplink shared channel (PUSCH) shared by the mobile stations 100$_n$ and an LTE uplink control channel are used. There are two types of uplink control channels: the first is an uplink control channel to be frequency-division-multiplexed with the physical uplink shared channel and the second is an uplink control channel to be time-division-multiplexed with the physical uplink shared channel. The uplink control channel to be frequency-division-multiplexed with the physical uplink shared channel may be called a physical uplink control channel (PUCCH). The uplink control channel to be time-division-multiplexed with the physical uplink shared channel is used, for example, to transmit a control signal such as a CQI or HARQ ACK information (described later) from the mobile station 100$_n$ to the base station 200. Such a control signal is mapped to the uplink control channel and multiplexed with the physical uplink shared channel.

Thus, in uplink, the LTE uplink control channel is used to report a downlink channel quality indicator (CQI) used for scheduling and adaptive modulation and coding (AMC) of the physical downlink shared channel and to transmit acknowledgement information (HARQ ACK information) for the physical downlink shared channel; and the physical uplink shared channel is used to transmit user data. Examples of the user data include IP packets in Web browsing, file transfer (FTP), and voice over IP (VoIP); and a control signal for radio resource control (RRC). The user data are mapped to the physical uplink shared channel (PUSCH) as a physical channel and to an uplink shared channel (UL-SCH) as a transport channel.

<Estimation of Congestion Level>

A configuration of the base station 200 that makes it possible to estimate the level of congestion (hereafter called the congestion level) is described below with reference to FIG. 2.

The base station 200 of this embodiment includes a transceiver antenna 202, an amplifier 204, a transceiver unit 206, a baseband signal processing unit 208, a call processing unit 210, and a transmission path interface 212.

Downlink packet data to be transmitted from the base station 200 to the mobile station 100$_n$ are sent from an upper node such as the access gateway 300 to the base station 200 and input to the baseband signal processing unit 208 via the transmission path interface 212.

The baseband signal processing unit 208 performs various processes for the packet data such as PDCP layer transmission processing; RLC layer transmission processing including segmentation/concatenation and a transmission process of radio link control (RLC) retransmission control; an HARQ (hybrid automatic repeat request) transmission process of MAC retransmission control; scheduling; selection of transport formats; channel coding; and inverse fast Fourier transform (IFFT) processing. Then, the baseband signal processing unit 208 sends the processed packet data (baseband signal) to the transceiver unit 206.

The transceiver unit 206 performs frequency conversion to convert the baseband signal output from the baseband signal processing unit 208 into a radio frequency signal. The radio frequency signal is amplified by the amplifier 204 and transmitted from the transceiver antenna 202.

Meanwhile, when a radio frequency signal including uplink data is transmitted from the mobile station 100$_n$ to the base station 200, the radio frequency signal is received by the transceiver antenna 202, amplified by the amplifier 204, and frequency-converted by the transceiver unit 206 into a baseband signal. Then, the transceiver unit 206 inputs the baseband signal to the baseband signal processing unit 208.

The baseband signal processing unit 208 performs various processes for the input baseband signal such as FFT processing, IDFT processing, error correction decoding, a reception process of MAC retransmission control, RLC layer reception processing, and PDCP layer reception processing, and transmits the processed signal via the transmission path interface 212 to the access gateway 300.

Also, as described later, the baseband signal processing unit 208 estimates the congestion level in the cell 50. For example, the baseband signal processing unit 208 calculates at least one of the following parameters:

(1) The number of mobile stations (hereafter called a first number of mobile stations) or the number of logical channels for which data to be transmitted via the PDSCH are present in downlink transmission buffers.

(2) The number of mobile stations (hereafter called a second number of mobile stations) or the number of logical channels for which data to be transmitted via the PUSCH are present in uplink transmission buffers.

(3) The number of mobile stations (hereafter called a third number of mobile stations) communicating frequently using shared channels such as the PDSCH and the PUSCH.

(4) The number of mobile stations (hereafter called a fourth number of mobile stations) communicating infrequently using shared channels such as the PDSCH and the PUSCH.

(5) The number of mobile stations in a connected state (i.e., mobile stations in the LTE Active state) in the cell (hereafter called a fifth number of mobile stations).

(6) The number of mobile stations (hereafter called a sixth number of mobile stations) in the LTE Active state or the number of their logical channels whose downlink transmission rates are less than a predetermined transmission rate.

(7) The number of mobile stations (hereafter called a seventh number of mobile stations) in the LTE Active state or the number of their logical channels whose uplink transmission rates are less than a predetermined transmission rate.

(8) The number of mobile stations (hereafter called an eighth number of mobile stations) or the number of logical channels whose buffering time of downlink data is greater than a predetermined threshold (i.e., the number of mobile stations or the number of logical channels whose average delay time of downlink data is greater than allowed delay time).

(9) The number of mobile stations (hereafter called a ninth number of mobile stations) or the number of logical channels whose buffering time of uplink data is greater than a predetermined threshold (i.e., the number of mobile stations or the number of logical channels whose average delay time of uplink data is greater than allowed delay time).

(10) The number of mobile stations (hereafter called a tenth number of mobile stations) or the number of logical channels whose downlink data have been discarded due to delay.

(11) The number of mobile stations (hereafter called an eleventh number of mobile stations) or the number of logical channels whose uplink data have been discarded due to delay.

The baseband signal processing unit 208 obtains a measurement(s) of the processing load of the base station 200 such as the usage rate of the central processing unit (CPU), the usage rate of a memory, and/or the usage rate of a buffer(s). Here, the buffer may be a PDCP layer data buffer, an RLC layer data buffer, a MAC layer data buffer, or two or more of them. The baseband signal processing unit 208 may obtain the measurement of the processing load of the base station 200 for each carrier or as a total value for multiple carriers. Also, when the base station 200 covers multiple sectors, the measurement of the processing load may be obtained for each sector.

The baseband signal processing unit 208 may also be configured to obtain a measurement of the processing load, such as a CPU usage rate or a memory usage rate, of another node such as the access gateway 300 or a node in the core network 400.

Then, based on at least one of the first through eleventh numbers of mobile stations, the measurement of the processing load of the base station 200, and the measurement of the processing load of the other node, the baseband signal processing unit 208 estimates the congestion level of the cell 50. The estimated congest level is used to change the priority of data (the priority level $A_n$) as described later.

To estimate the congestion level, the baseband signal processing unit 208 may be configured to compare one or more of the first through eleventh numbers of mobile stations with a first threshold TH1 through an eleventh threshold TH11 that are predetermined. Also, the baseband signal processing unit 208 may be configured to compare the measurements of the processing load of the base station 200 and the other node with a twelfth threshold TH12 and a thirteenth threshold TH13 to estimate the congestion level.

For example, the baseband processing unit 208 may be configured to determine that the cell is congested if at least one of 13 determination formulas as shown in FIG. 3 is true and to determine that the cell is not congested if all of the 13 determination formulas are not true.

Alternatively, the baseband processing unit 208 may be configured to determine that the cell is not congested if all of the 13 determination formulas as shown in FIG. 3 are true and to determine that the cell is congested if at least one of the 13 determination formulas is not true.

Also, the baseband processing unit 208 may be configured to determine whether the cell is congested by using some of the 13 determination formulas instead of using all of them.

In the above examples, only one threshold is used in each of the determination formulas to determine the congestion level. Therefore, only two congestion levels (congested and not congested) can be expressed. Alternatively, three or more congestion levels may be expressed by using two or more thresholds for each determination formula.

Also, the congestion level of a cell may be determined for each service type, subscriber plan type, terminal type, radio bearer, logical channel, or priority class. In this case, the first through eleventh numbers of mobile stations are calculated for each service type, subscriber plan type, terminal type, radio bearer, logical channel, or priority class; and the first threshold TH1 through the eleventh threshold TH11 are defined for each service type, subscriber plan type, terminal type, radio bearer, logical channel, or priority class.

The service type indicates the type of service used to transmit downlink packets. Exemplary service types include a VoIP service, a voice service, a streaming service, and a file transfer protocol (FTP) service.

The subscriber plan type indicates the type of plan the user of a user equipment is subscribing to. Exemplary subscriber plan types include a low class plan, a high class plan, a flat-rate plan, and a pay-as-you-go plan.

The terminal type indicates the type (or class) of a user equipment to which a downlink signal is to be transmitted. Terminal types (or classes) are determined, for example, based on the identification information of user equipments or the capabilities of user equipments such as a supported modulation scheme or a supported number of bits.

Logical channels include, for example, a dedicated control channel (DCCH) and a dedicated traffic channel (DTCH). Also, multiple logical channels may be defined in each of the DCCH and the DTCH.

The radio bearer is a service provided for the transfer of data and is defined for each logical channel to be transmitted. Therefore, "radio bearer" is essentially synonymous with "logical channel".

Priority classes are used to classify downlink and uplink transmission data by their priorities. For example, data of a first priority class are preferentially transmitted over data of a second priority class. Priority classes may be associated with logical channels and called logical channel priority. Or, the priority classes may be used to represent the priority level.

The first number of mobile stations through the eleventh number of mobile stations and the measurements of the processing load of the base station 200 and the other node may be represented by instantaneous values or average values over a predetermined averaging period.

The call processing unit 210 performs call processing such as establishment and release of communication channels, status management of the base station 200, and management of radio resources.

A configuration of the baseband signal processing unit 208 is described below with reference to FIG. 4.

The baseband signal processing unit 208 includes a layer 1 processing unit 2081, a MAC (medium access control) processing unit 2082, an RLC/PDCP processing unit 2083, and a congestion level estimation unit 2084.

The layer 1 processing unit 2081, the MAC processing unit 2082, the RLC/PDCP processing unit 2083, and the congestion level estimation unit 2084 of the baseband signal processing unit 208 and the call processing unit 210 are connected to each other.

The layer 1 processing unit 2081 performs channel coding and IFFT processing on downlink transmission data and performs channel decoding, IDFT processing, and FFT processing on uplink transmission data.

The MAC processing unit 2082 performs, for example, MAC retransmission control such as an HARQ (hybrid automatic repeat request) transmission process, scheduling, and selection of transport formats for downlink data. Also, the MAC processing unit 2082 performs a reception process of MAC retransmission control for uplink data.

Further, the MAC processing unit 2082 obtains information, reported by the mobile station $100_n$, indicating the status (hereafter called uplink transmission buffer status) of an uplink transmission buffer of the mobile station $100_n$, and reports the uplink transmission buffer status to the congestion level estimation unit 2084. The information indicating the uplink transmission buffer status of the mobile station $100_n$ may be called a buffer status report and includes an absolute value or a relative value indicating the amount of buffered data in the uplink transmission buffer of the mobile station $100_n$. The MAC processing unit 2082 reports the absolute value or the relative value indicating the amount of buffered data in the uplink transmission buffer of the mobile station $100_n$ to the congestion level estimation unit 2084.

The buffer status report may include an absolute value or a relative value indicating the amount of buffered data for each of two or more prioritized groups. Alternatively, the buffer status report may include an absolute value or a relative value indicating the amount of buffered data for each of one or more prioritized groups, and an absolute value or a relative value indicating the amount of buffered data for all the data. The buffer status report may be reported from the mobile station $100_n$ to the base station 200 as MAC layer control information. The MAC layer control information may also be called a MAC control element.

The MAC processing unit 2082 also measures uplink and downlink transmission rates of the mobile station $100_n$ in the MAC layer (uplink and downlink MAC layer transmission rates) and reports the measured uplink and downlink MAC layer transmission rates to the congestion level estimation unit 2084.

The uplink and downlink MAC layer transmission rates may be represented by instantaneous values at measurement timing or average values over a predetermined averaging period before the measurement timing. The average values may be obtained by a simple arithmetic averaging method or by an averaging method employing a forgetting factor. Also, the uplink and downlink MAC layer transmission rates may be represented by instantaneous values sampled at a predetermined sampling interval or averages of the sampled instantaneous values.

For example, a MAC layer transmission rate may be represented by a filtered value $F_n$ obtained by calculating an average or a sum of measurements obtained in a predetermined time period of, for example, 100 ms, and by filtering the average or the sum using a formula shown below.

$$F_n = (1-a) \times F_{n-1} + aM_n$$

$F_n$: current value obtained by filtering
$F_{n-1}$: previous value obtained by filtering
a: filtering factor
$M_n$: average or sum of measurements obtained in a predetermined time period of, for example, 100 ms For example, the filtering factor "a" may be set at $1/2^{(k/2)}$ (k=0, 1, 2, ...). The predetermined time period may be set at any appropriate value (e.g., 200 ms or 80 ms) other than 100 ms.

Figure 5:
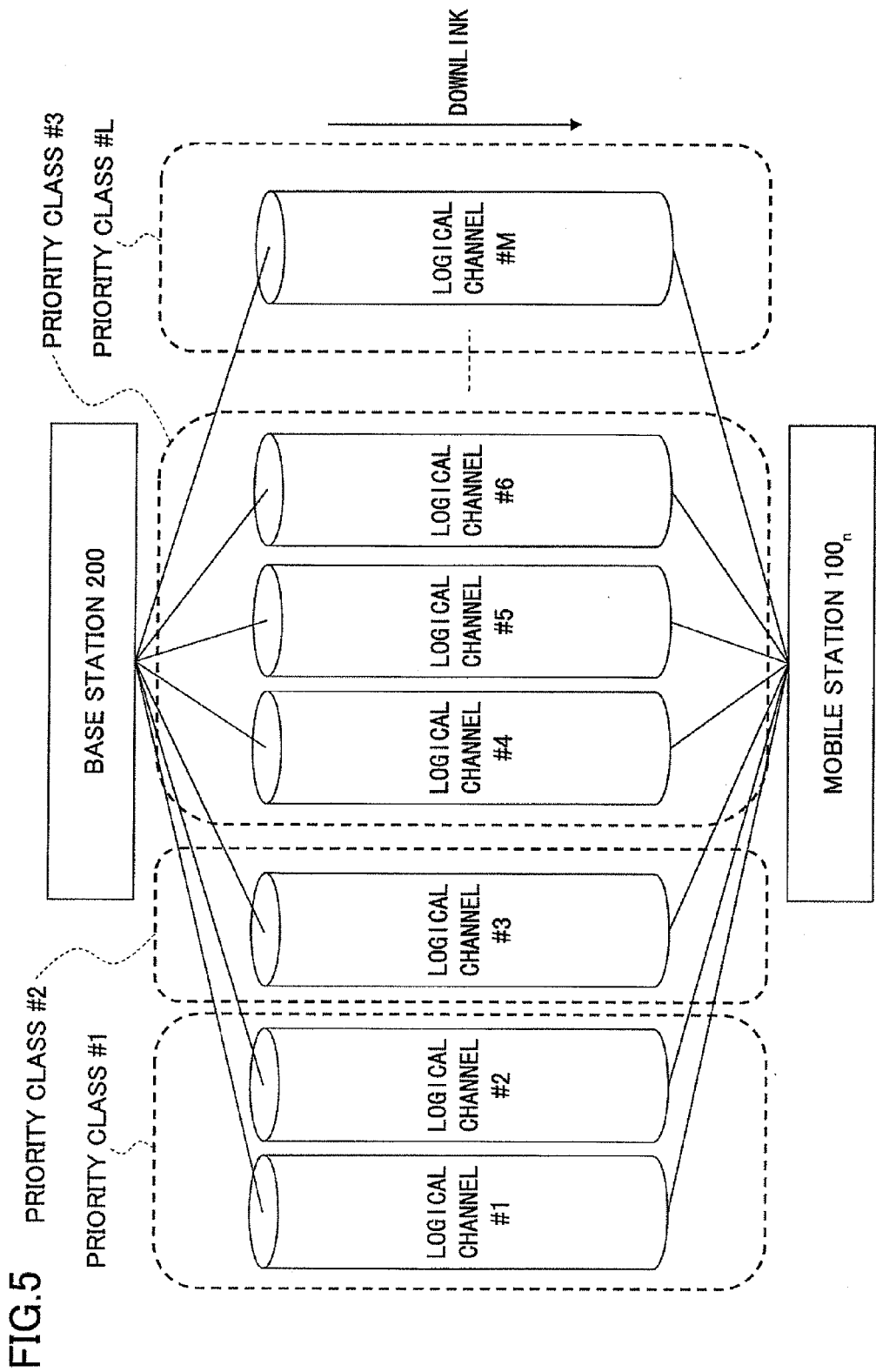
FIG. 5 is a drawing illustrating relationships between logical channels and priority classes.

Generally, multiple logical channels are used for communications between the mobile station $100_n$ and the base station 200, and priority classes are defined for the logical channels. FIG. 5 shows exemplary relationships between logical channels and priority classes. In FIG. 5, M logical channels and L priority classes are defined for downlink. Also for uplink, logical channels and priority classes may be defined in a similar manner. The priority classes may be called logical channel priority.

Instead of measuring the MAC layer transmission rate of the mobile station $100_n$, the MAC processing unit 2082 may be configured to measure MAC layer transmission rates of logical channels used for communications between the base station 200 and the mobile station $100_n$, or to obtain an average or a sum of MAC layer transmission rates of logical channels in each priority class. In this case, the MAC processing unit 2082 reports the transmission rates of the logical channels or the average or sum of the transmission rates of the logical channels in each priority class to the congestion level estimation unit 2084. Transmission rates or the averages or sums of transmission rates are obtained for both uplink and downlink.

The MAC processing unit 2082 also determines whether the mobile station $100_n$ is in a DRX mode, and reports information indicating whether the mobile station $100_n$ is in the DRX mode to the congestion level estimation unit 2084. The DRX mode stands for a discontinuous reception mode where the mobile station $100_n$ performs discontinuous reception. The discontinuous reception is performed when a connection is established between the mobile station $100_n$ and the base station 200 but there are no data to be transmitted or received to reduce the power consumption of the mobile station $100_n$. A mobile station in the DRX mode is assumed to be communicating infrequently using a shared channel. Meanwhile, a mobile station not in the DRX mode is assumed to be communicating frequently using a shared channel.

The MAC processing unit 2082 receives, from the RLC/PDCP processing unit 2083, arrival time of downlink packet data transmitted from an upper node to the base station 200. With the received arrival time, the MAC processing unit 2082 calculates buffering time of the downlink packet data for the mobile station $100_n$. The buffering time of downlink packet data indicates a period of time during which the downlink packet data are retained in the base station 200. More specifically, the buffering time of downlink packet data is a period of time from the arrival time of the downlink packet data to the time when the downlink packet data are transmitted via a downlink shared channel from the base station 200 to the mobile station $100_n$. Alternatively, the buffering time of downlink packet data may be defined as a period of time from the arrival time of the downlink packet data to the time when ACK is received as the acknowledgement information for the downlink packet data transmitted via a downlink shared channel from the base station 200 to the mobile station $100_n$, i.e., when correct reception of the packet data at the mobile station $100_n$ is confirmed. The acknowledgement information may be MAC layer information, RLC layer information, or PDCP layer information. The MAC processing unit 2082 may calculate an average of buffering time of multiple sets of downlink packet data. The MAC processing unit 2082 reports the calculated buffering time of downlink packet data for the mobile station $100_n$ to the congestion level estimation unit 2084.

Also, the MAC processing unit 2082 calculates buffering time of uplink packet data at the mobile station $100_n$. The buffering time of uplink packet data indicates a period of time during which the packet data are retained in the mobile station $100_n$. Here, it is difficult for the base station 200 to accurately determine the status of a buffer in the mobile station $100_n$. Therefore, the buffering time of uplink packet data may be defined as a period of time from when a buffer status report is received from the mobile station $100_n$ to the time when the base station 200 transmits a UL scheduling grant to the mobile station $100_n$ to request transmission of an uplink shared channel. Alternatively, the buffering time of uplink packet data may be defined as a period of time from when a buffer status report is received from the mobile station $100_n$ to the time when the base station 200 correctly receives an uplink shared channel transmitted in response to a UL scheduling grant requesting the mobile station $100_n$ to transmit the uplink shared channel. The MAC processing unit 2082 may calculate an average of buffering time of multiple sets of uplink packet data. The MAC processing unit 2082 reports the calculated buffering time of uplink packet data in the mobile station $100_n$ to the congestion level estimation unit 2084.

The RLC/PDCP processing unit 2083 performs PDCP layer processing, and RLC layer transmission processing such as segmentation/concatenation and a transmission process of RLC retransmission control for downlink packet data. The RLC/PDCP processing unit 2083 also performs PDCP layer processing such as segmentation/concatenation and RLC layer reception processing such as a reception process of RLC retransmission control for uplink packet data.

Further, the RLC/PDCP processing unit 2083 measures uplink and downlink transmission rates of the mobile station $100_n$ in the RLC layer (uplink and downlink RLC layer transmission rates) and reports the measured RLC layer transmission rates to the congestion level estimation unit 2084.

The uplink and downlink RLC layer transmission rates may be represented by instantaneous values at measurement timing or average values over a predetermined averaging period before the measurement timing. The average values may be obtained by a simple arithmetic averaging method or by an averaging method employing a forgetting factor. Also, the uplink and downlink RLC layer transmission rates may be represented by instantaneous values sampled at a predetermined sampling interval or averages of the sampled instantaneous values.

For example, an RLC layer transmission rate may be represented by a filtered value Fn obtained by calculating an average or a sum of measurements obtained in a predetermined time period of, for example, 100 ms, and by filtering the average or the sum using a formula shown below.

$$F_n = (1-a) \times F_{n-1} + aM_n$$

$F_n$: current value obtained by filtering
$F_{n-1}$: previous value obtained by filtering
a: filtering factor
$M_n$: average or sum of measurements obtained in a predetermined time period of, for example, 100 ms For example, the filtering factor "a" may be set at $1/2^{(k/2)}$ (k=0, 1, 2, ... ). The predetermined time period may be set at any appropriate value (e.g., 200 ms or 80 ms) other than 100 ms.

Instead of measuring the RLC layer transmission rate of the mobile station $100_n$, the RLC/PDCP processing unit 2083 may be configured to measure RLC layer transmission rates of logical channels used for communications between the base station 200 and the mobile station $100_n$, or to obtain an average or a sum of RLC layer transmission rates of logical channels in each priority class. In this case, the RLC/PDCP processing unit 2083 reports the transmission rates of the logical channels or the average or sum of the transmission rates of the logical channels in each priority class to the congestion level estimation unit 2084. Transmission rates or the averages or sums of transmission rates are obtained for both uplink and downlink.

The RLC/PDCP processing unit 2083 also reports the status (hereafter called downlink RLC layer transmission buffer status) of a downlink RLC layer transmission buffer for the mobile station $100_n$ to the congestion level estimation unit 2084. The downlink RLC layer transmission buffer status indicates the amount of buffered packet data in the RLC layer or the time (hereafter called buffering time) for which packet data are buffered in the RLC layer.

The RLC/PDCP processing unit 2083 may report the downlink RLC layer transmission buffer status for each logical channel used for communications with the mobile station $100_n$.

The RLC/PDCP processing unit 2083 monitors arrival time of downlink packet data for the mobile station $100_n$ transmitted from an upper node to the base station 200, and reports the monitored arrival time of the downlink packet data to the MAC processing unit 2082.

The RLC/PDCP processing unit 2083 may also have a function to discard downlink packet data buffered in an RLC layer transmission buffer for a period of time greater than a predetermined allowed delay time. When discarding downlink packet data buffered in an RLC layer transmission buffer for a period of time greater than the predetermined allowed delay time, the RLC/PDCP processing unit 2083 may report information on the mobile station $100_n$ that is the destination of the discarded packet data to the congestion level estimation unit 2084.

In the above examples, the RLC/PDCP processing unit 2083 reports transmission rates, a transmission buffer status, and discarding of packet data in the RLC layer to the congestion level estimation unit 2084. In addition, the RLC/PDCP processing unit 2083 may be configured to perform similar processing regarding the PDCP layer.

For example, the RLC/PDCP processing unit 2083 may be configured to measure PDCP layer transmission rates (transmission rates in the PDCP layer) in addition to RLC layer transmission rates of the mobile station $100_n$ or of the logical channels used for communications with the mobile station $100_n$ and to report the measured transmission rates to the congestion level estimation unit 2084.

Also, the RLC/PDCP processing unit 2083 may be configured to report a downlink PDCP layer transmission buffer status in addition to a downlink RLC layer transmission buffer status for the mobile station $100_n$ or for each logical channel used for communications with the mobile station $100_n$ to the congestion level estimation unit 2084.

Further, instead of discarding downlink packet data buffered in an RLC layer transmission buffer for a period of time greater than the predetermined allowed delay time, the RLC/PDCP processing unit 2083 may be configured to discard downlink packet data buffered in a PDCP layer transmission buffer for a period of time greater than the predetermined allowed delay time. When discarding downlink packet data buffered in a PDCP layer transmission buffer for a period of time greater than the predetermined allowed delay time, the RLC/PDCP processing unit 2083 may report information on the mobile station 100$_n$ that is the destination of the discarded packet data to the congestion level estimation unit 2084. Also, the RLC/PDCP processing unit 2083 may be configured to discard downlink packet data buffered in a PDCP layer transmission buffer or an RLC layer transmission buffer for a period of time greater than the predetermined allowed delay time and to report information on the mobile station 100$_n$ that is the destination of the discarded packet data to the congestion level estimation unit 2084.

The RLC/PDCP processing unit 2083 may also be configured to monitor uplink PDCP layer sequence numbers and to report to the congestion level estimation unit 2084 if discontinuity in the uplink PDCP layer sequence numbers is detected.

The congestion level estimation unit 2084 receives the uplink transmission buffer status of the mobile stations 100$_n$, the uplink and downlink MAC layer transmission rates of the mobile stations 100$_n$, and the information indicating whether the mobile stations 100$_n$ are in the DRX mode from the MAC processing unit 2082; and receives the uplink and downlink RLC/PDCP layer transmission rates of the mobile stations 100$_n$ and the downlink RLC/PDCP layer transmission buffer status of the mobile stations 100$_n$ from the RLC/PDCP processing unit 2083.

The congestion level estimation unit 2084 also receives the buffering time of downlink packet data and the buffering time of uplink packet data of the mobile stations 100$_n$ from the MAC processing unit 2082. The congestion level estimation unit 2084 further receives information on the mobile stations 100$_n$ that are destinations of packet data discarded in the RLC/PDCP layer transmission buffer from the RLC/PDCP processing unit 2083.

Based on the uplink transmission buffer status of the mobile stations 100$_n$, the uplink and downlink MAC layer transmission rates of the mobile stations 100$_n$, the information indicating whether the mobile stations 100$_n$ are in the DRX mode, the uplink and downlink RLC/PDCP layer transmission rates of the mobile stations 100$_n$, and the downlink RLC/PDCP layer transmission buffer status of the mobile stations 100$_n$, the congestion level estimation unit 2084 calculates the first through seventh numbers of mobile stations. Also, based on the buffering time of downlink packet data and the buffering time of uplink packet data of the mobile stations 100$_n$, the congestion level estimation unit 2084 calculates the eighth and ninth numbers of mobile stations. Further, based on the information on the mobile stations 100$_n$ that are destinations of packet data discarded in the RLC/PDCP layer transmission buffer, the congestion level estimation unit 2084 calculates the tenth and eleventh numbers of mobile stations.

As the first number of mobile stations for which data to be transmitted via the PDSCH are present in downlink transmission buffers, the congestion level estimation unit 2084, for example, calculates the number of mobile stations whose amounts of buffered data in the RLC layer or the PDCP layer are greater than or equal to a predetermined threshold based on the downlink RLC/PDCP layer transmission buffer status of the mobile stations 100$_n$. The threshold may be set at 0 KB or a value other than 0 KB (e.g., 10 KB). The amounts of buffered data may be represented by instantaneous values at measurement timing or average values over a predetermined averaging period before the measurement timing. The average values may be obtained by a simple arithmetic averaging method or by an averaging method employing a forgetting factor. Also, the amounts of buffered data may be represented by instantaneous values sampled at a predetermined sampling interval or averages of the sampled instantaneous values.

For example, the amount of buffered data may be represented by a filtered value $F_n$ obtained by calculating an average or a sum of measurements obtained in a predetermined time period of, for example, 100 ms, and by filtering the average or the sum using a formula shown below.

$$F_n = (1-a) \times F_{n-1} + aM_n$$

$F_n$: current value obtained by filtering
$F_{n-1}$: previous value obtained by filtering
a: filtering factor
$M_n$: average or sum of measurements obtained in a predetermined time period of, for example, 100 ms For example, the filtering factor "a" may be set at $1/2^{(k/2)}$ (k=0, 1, 2, ...). The predetermined time period may be set at any appropriate value (e.g., 200 ms or 80 ms) other than 100 ms.

Alternatively, the congestion level estimation unit 2084 may be configured to calculate the number of mobile stations whose buffering time of packet data in the RLC layer or the PDCP layer is greater than or equal to a predetermined threshold based on the downlink RLC/PDCP layer transmission buffer status of the mobile stations 100$_n$, and to use the calculated number of mobile stations as the first number of mobile stations for which data to be transmitted via the PDSCH are present in downlink transmission buffers. The threshold may be set at 0 ms or a value other than 0 ms (e.g., 10 ms). The buffering time may be represented by instantaneous values at measurement timing or average values over a predetermined averaging period before the measurement timing. The average values may be obtained by a simple arithmetic averaging method or by an averaging method employing a forgetting factor. Also, the buffering time may be represented by instantaneous values sampled at a predetermined sampling interval or averages of the sampled instantaneous values.

For example, the buffering time may be represented by a filtered value $F_n$ obtained by calculating an average or a sum of measurements obtained in a predetermined time period of, for example, 100 ms, and by filtering the average or the sum using a formula shown below.

$$F_n = (1-a) \times F_{n-1} + aM_n$$

$F_n$: current value obtained by filtering
$F_{n-1}$: previous value obtained by filtering
a: filtering factor
$M_n$: average or sum of measurements obtained in a predetermined time period of, for example, 100 ms For example, the filtering factor "a" may be set at $1/2^{(k/2)}$ (k=0, 1, 2, ...). The predetermined time period may be set at any appropriate value (e.g., 200 ms or 80 ms) other than 100 ms.

The averaging period, the forgetting factor, and the threshold described above may be set as parameters.

Also, the congestion level estimation unit 2084 may be configured to obtain the first number of mobile stations for which data to be transmitted via the PDSCH are present in downlink transmission buffers based on the sum of the amount of buffered data in the RLC layer and the amount of buffered data in the MAC layer. Alternatively, the congestion level estimation unit 2084 may be configured to obtain the first number of mobile stations for which data to be transmitted via the PDSCH are present in downlink transmission buffers based on the sum of the amount of buffered data in the RLC layer, the amount of buffered data in the RLC layer, and the amount of buffered data in the MAC layer. The amount of buffered data in the MAC layer indicates, for example, the amount of data to be retransmitted by HARQ of the MAC layer.

Further, the congestion level estimation unit 2084 may be configured to use the number of candidate mobile stations that are regarded as candidates for selection in the scheduling performed by the MAC processing unit 2082 as the first number of mobile stations for which data to be transmitted via the PDSCH are present in downlink transmission buffers.

Here, a candidate mobile station, for example, satisfies all of the following conditions:

(Condition 1) Data to be transmitted via the PDSCH are present for the mobile station.

(Condition 2) The time frame for transmitting a downlink shared channel or the time frame for receiving acknowledgement information for the downlink shared channel does not overlap the time period for making measurements for a cell using a different frequency at the mobile station.

(Condition 3) The mobile station is not in a sleep period in the discontinuous reception mode.

(Condition 4) The RLC layer transmission window is not stalled.

Here, a mobile station that has just been handed over to the cell 50 from another cell may not be regarded as a candidate for selection in the scheduling even if the mobile station satisfies all of the conditions 1 through 4 until data transfer from a handover-originating base station is completed and a PDCP layer status report is received.

In determining whether a mobile station satisfies the condition 1, if handover of the mobile station to a different base station is to be requested or has been requested, only a control signal (DCCH) may be regarded as the data to be transmitted and other signals such as user data (DTCH) may not be regarded as the data to be transmitted.

Also in determining whether a mobile station satisfies the condition 1, if uplink synchronization of the mobile station has not been established, only a control signal (DCCH) or MAC layer control information may be regarded as the data to be transmitted and other signals such as user data (DTCH) may not be regarded as the data to be transmitted.

The congestion level estimation unit 2084 may be configured to calculate the first number of mobile stations for each logical channel. In this case, the first number of mobile stations is represented by the number of logical channels. In other words, the congestion level estimation unit 2084 calculates the number of logical channels.

Also, the congestion level estimation unit 2084 may be configured to calculate the first number of mobile stations for each priority class. In this case, the first number of mobile stations is represented by the number of logical channels belonging to each priority class. In other words, the congestion level estimation unit 2084 calculates the number of logical channels belonging to each priority class.

As the second number of mobile stations for which data to be transmitted via the PUSCH are present in uplink transmission buffers, the congestion level estimation unit 2084, for example, calculates the number of mobile stations whose absolute values indicating the amounts of buffered data in uplink transmission buffers are greater than or equal to a predetermined threshold based on the uplink transmission buffer status of the mobile stations 100$_n$. The threshold may be set at 0 KB or a value other than 0 KB (e.g., 10 KB). The amounts of buffered data may be represented by instantaneous values at measurement timing or average values over a predetermined averaging period before the measurement timing. The average values may be obtained by a simple arithmetic averaging method or by an averaging method employing a forgetting factor. Also, the amounts of buffered data may be represented by instantaneous values sampled at a predetermined sampling interval or averages of the sampled instantaneous values.

For example, the amount of buffered data may be represented by a filtered value $F_n$ obtained by calculating an average or a sum of measurements obtained in a predetermined time period of, for example, 100 ms, and by filtering the average or the sum using a formula shown below.

$$F_n = (1-a) \times F_{n-1} + a M_n$$

$F_n$: current value obtained by filtering
$F_{n-1}$: previous value obtained by filtering
a: filtering factor
$M_n$: average or sum of measurements obtained in a predetermined time period of, for example, 100 ms For example, the filtering factor "a" may be set at $1/2^{(k/2)}$ (k=0, 1, 2, . . . ). The predetermined time interval may be set at any appropriate value (e.g., 200 ms or 80 ms) other than 100 ms.

The averaging period, the forgetting factor, and the threshold described above may be set as parameters.

The amount of buffered data is intermittently reported by the mobile station. Therefore, if the PUSCH is transmitted from the mobile station between report timings of the amount of buffered data, the reported amount of buffered data may be different from the actual value. To prevent this problem, the congestion level estimation unit 2084 may be configured to calculate the amount of buffered data of a mobile station based on a value reported by the mobile station and the amount of data transmitted via the PUSCH from the mobile station between the report timings.

Alternatively, the congestion level estimation unit 2084 may be configured to use the number of candidate mobile stations that are regarded as candidates for selection in the scheduling performed by the MAC processing unit 2082 as the second number of mobile stations for which data to be transmitted via the PUSCH are present in uplink transmission buffers.

Here, a candidate mobile station, for example, satisfies all of the following conditions:

(Condition 1) Data to be transmitted via the PUSCH are present for the mobile station (presence of transmission data in a buffer of the mobile station is reported by the mobile station via a scheduling request or a buffer status report).

(Condition 2) The time frame for transmitting a downlink control channel (UL scheduling grant), the time frame for receiving an uplink shared channel, or the time frame for transmitting acknowledgement information for the uplink shared channel does not overlap the time period for making measurements for a cell using a different frequency at the mobile station.

(Condition 3) The mobile station is not in the DRX mode.

(Condition 4) Uplink synchronization has been established.

(Condition 5) Handover to a different base station is not requested.

The congestion level estimation unit 2084 may be configured to calculate the second number of mobile stations for each logical channel. In this case, the second number of mobile stations is represented by the number of logical channels. In other words, the congestion level estimation unit 2084 calculates the number of logical channels. Also, the congestion level estimation unit 2084 may be configured to calculate the second number of mobile stations for each priority class. In this case, the second number of mobile stations is represented by the number of logical channels belonging to each priority class. In other words, the congestion level estimation unit 2084 calculates the number of logical channels belonging to each priority class.

Mobile stations whose transmission data (data to be transmitted via PUSCH or PDSCH) are in uplink or downlink transmission buffers are assumed to be communicating using radio resources. Therefore, the number of mobile stations whose transmission data are in uplink or downlink transmission buffers is linked with the amount of radio resources being used.

As the third number of mobile stations communicating frequently using shared channels such as the PDSCH and the PUSCH, the congestion level estimation unit 2084, for example, calculates the number of mobile stations that are in the LTE active state and not in the DRX mode based on the information indicating whether the mobile stations 100, are in the DRX mode.

Mobile stations that are not in the DRX mode are assumed to be communicating using radio resources. Therefore, the number of mobile stations not in the DRX mode is linked with the amount of used radio resources.

As the fourth number of mobile stations communicating infrequently using shared channels such as the PDSCH and the PUSCH, the congestion level estimation unit 2084, for example, calculates the number of mobile stations that are in the LTE active state and in the DRX mode based on the information indicating whether the mobile stations 100, are in the DRX mode.

Mobile stations that are in the DRX mode are assumed to be using only a small amount of radio resources. Still, calculating the number of mobile stations in the DRX mode makes it possible to more accurately estimate the amount of radio resources being used.

As the fifth number of mobile stations, the congestion level estimation unit 2084, for example, calculates the number of mobile stations that are in the LTE Active state. The number of mobile stations in the LTE Active state corresponds to the number of mobile stations that have established a connection with the base station 200, and therefore the base station 200 is able to easily determine the number of mobile stations in the LTE Active state.

As the sixth or seventh number of mobile stations that are in the LTE Active state and whose transmission rates are less than a predetermined transmission rate, the congestion level estimation unit 2084, for example, calculates the number of mobile stations whose uplink or downlink transmission rates in the PDCP, RLC, or MAC layer are less than a predetermined transmission rate based on the uplink or downlink PDCP/RLC/MAC layer transmission rates of the mobile stations $100_n$. For example, the congestion level estimation unit 2084 may use the number of mobile stations whose uplink or downlink RLC layer transmission rates are less than or equal to 64 kbps as the sixth or seventh number of mobile stations that are in the LTE Active state and whose transmission rates are less than a predetermined transmission rate.

Figure 6:
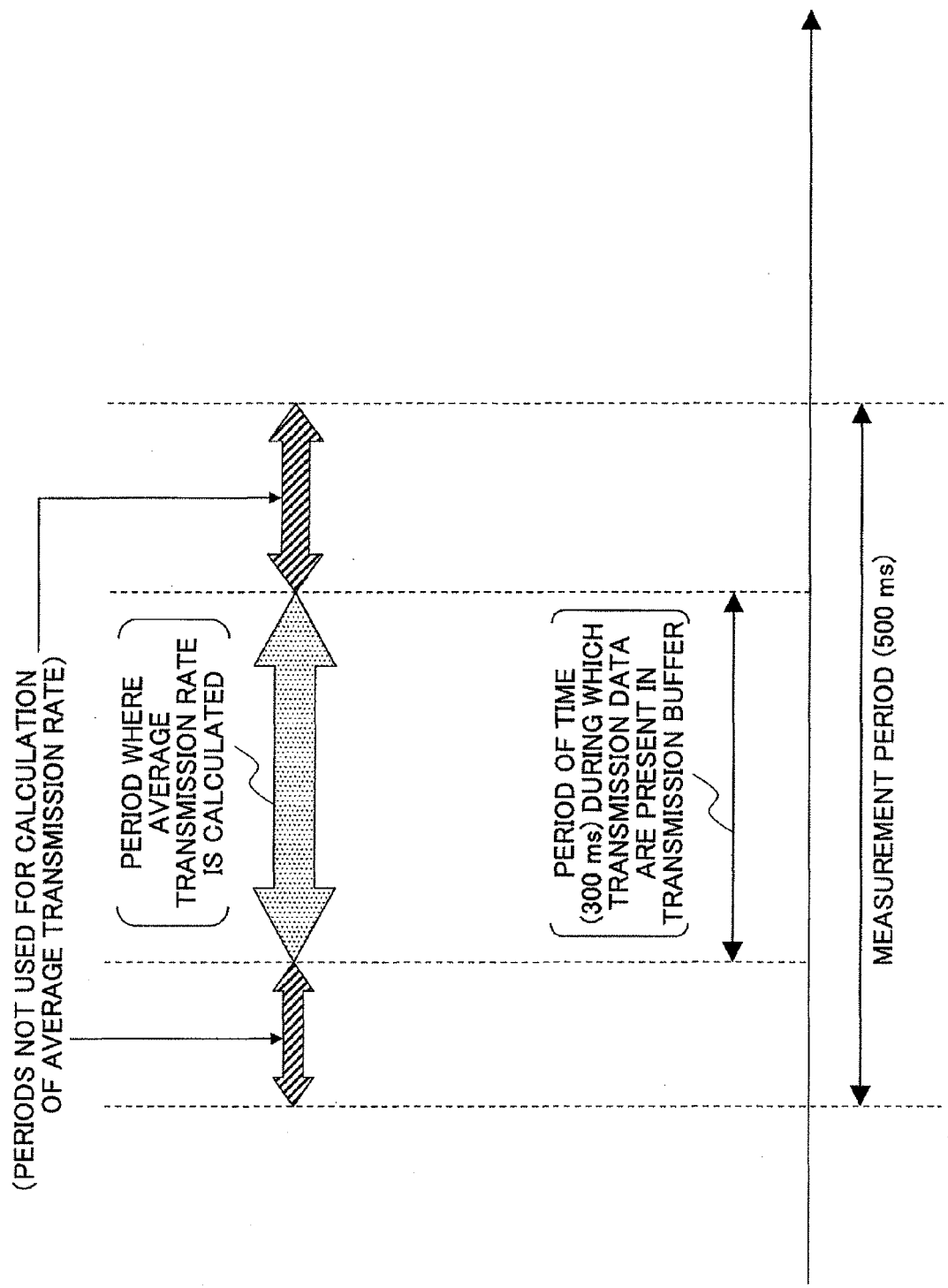
FIG. 6 is a drawing illustrating an averaging period where an average transmission rate is calculated.

An uplink or downlink PDCP/RLC/MAC layer transmission rate of the mobile station $100_n$ may be obtained by averaging transmission rates measured during an averaging period and the averaging period may be defined as a period of time during which transmission data are present in the uplink or downlink transmission buffer. For example, when the measurement period is 500 ms and transmission data are present in the transmission buffer for 300 ms in the measurement period as shown in FIG. 6, the PDCP/RLC/MAC layer transmission rate of the mobile station 100, is calculated by averaging transmission rates measured during the 300-ms period.

In this case, transmission rates measured during the rest of the measurement period are not used for calculating the average.

Alternatively, an uplink or downlink PDCP/RLC/MAC layer transmission rate of the mobile station $100_n$ may be obtained by averaging transmission rates measured during the entire measurement period regardless of whether transmission data are present in the uplink or downlink transmission buffer.

The congestion level estimation unit 2084 may be configured to calculate the sixth or seventh number of mobile stations for each logical channel. In this case, the sixth or seventh number of mobile stations is represented by the number of logical channels, and transmission rates of the logical channels are used for the calculations. In other words, the congestion level estimation unit 2084 calculates the number of logical channels whose transmission rates are less than a predetermined transmission rate.

The congestion level estimation unit 2084 may be configured to calculate the sixth or seventh number of mobile stations for each priority class. In this case, the sixth or seventh number of mobile stations is represented by, the number of logical channels in each priority class, and averages or sums of transmission rates of logical channels belonging to each priority class are used for the calculations. In other words, the congestion level estimation unit 2084 calculates, for each priority class, the number of logical channels whose transmission rates are less than a predetermined transmission rate.

The congestion level estimation unit 2084 calculates the eighth or ninth number of mobile stations whose average delay time of data is greater than an allowed delay time based on the buffering time of downlink or uplink packet data of the mobile stations $100_n$. For example, assuming that a threshold for the buffering time is set at 200 ms, the congestion level estimation unit 200 calculates the number of mobile stations whose buffering time of downlink or uplink packet data is greater than 200 ms, and uses the calculated number of mobile stations as the eighth or ninth number of mobile stations.

An exemplary method of calculating the average delay time of data is described below. In this method, the buffering time of a packet is defined as a period of time from when the packet in the RLC layer is stored in the RLC layer buffer to when the packet is removed from the RLC layer buffer. The packet is, for example, removed from the RLC layer buffer when acknowledgement information for the packet is received or when a period of time set by a time elapses. The average delay time is then obtained by averaging the buffering time of all packets within a predetermined averaging period. The packet, for example, indicates an RLC SDU. Alternatively, average delay time may be calculated for packets in the PDCP layer.

The congestion level estimation unit 2084 may be configured to calculate the eighth or ninth number of mobile stations for each logical channel. In this case, the eighth or ninth number of mobile stations is represented by the number of logical channels. In other words, the congestion level estimation unit 2084 calculates the number of logical channels whose average delay time is greater than the allowed delay time.

The congestion level estimation unit 2084 may be configured to calculate the eighth or ninth number of mobile stations for each priority class. In this case, the eighth or ninth number of mobile stations is represented by the number of logical channels in each priority class. In other words, the congestion level estimation unit 2084 calculates, for each priority class, the number of logical channels whose average delay time is greater than the allowed delay time.

The congestion level estimation unit 2084, for example, calculates the tenth number of mobile stations whose data have been discarded due to delay based on the information on the mobile stations $100_n$ that are destinations of packet data discarded at the RLC layer transmission buffer. For example, the congestion level estimation unit 2084 measures, in a predetermined monitoring period, the number of mobile stations whose packet data are discarded at the RLC layer transmission buffer and uses the measured number of mobile stations as the tenth number of mobile stations.

Alternatively, the congestion level estimation unit 2084 may be configured to measure, in a predetermined monitoring period, the number of mobile stations whose packet data are discarded at the RLC layer transmission buffer for a number of times greater than a predetermined threshold and to use the measured number of mobile stations as the tenth number of mobile stations.

Also, the congestion level estimation unit 2084 may be configured to measure, in a predetermined monitoring period, the number of mobile stations whose amounts of packet data discarded at the RLC layer transmission buffer are greater than a predetermined threshold and to use the measured number of mobile stations as the tenth number of mobile stations.

Also, the congestion level estimation unit 2084 may be configured to measure, in a predetermined monitoring period, the number of mobile stations whose ratios of packet data discarded at the RLC layer transmission buffer to all the data are greater than a predetermined threshold and to use the measured number of mobile stations as the tenth number of mobile stations.

When receiving the information on the mobile stations $100_n$ that are destinations of packet data discarded at the PDCP layer transmission buffer from the RLC/PDCP processing unit 2083 instead of the information on the mobile stations $100_n$ that are destinations of packet data discarded at the RLC layer transmission buffer, the congestion level estimation unit 2084 may calculate the tenth number of mobile stations whose data have been discarded due to delay based on the received information. For example, the congestion level estimation unit 2084 may be configured to measure, in a predetermined monitoring period, the number of mobile stations whose packet data are discarded at the PDCP layer transmission buffer and to use the measured number of mobile stations as the tenth number of mobile stations.

Also, the congestion level estimation unit 2084 may be configured to calculate the tenth number of mobile stations whose data have been discarded due to delay based on the information on the mobile stations $100_n$ that are destinations of packet data discarded at the PDCP layer transmission buffer or the RLC layer transmission buffer. For example, the congestion level estimation unit 2084 may be configured to measure, in a predetermined monitoring period, the number of mobile stations whose packet data are discarded at the PDCP layer transmission buffer or the RLC layer transmission buffer and to use the measured number of mobile stations as the tenth number of mobile stations.

The congestion level estimation unit 2084 may be configured to calculate the tenth number of mobile stations for each logical channel. In this case, the tenth number of mobile stations is represented by the number of logical channel. In other words, the congestion level estimation unit 2084 calculates the number of logical channels whose data have been discarded due to delay.

Also, the congestion level estimation unit 2084 may be configured to calculate the tenth number of mobile stations for each priority class. In this case, the tenth number of mobile stations is represented by, the number of logical channels in each priority class. In other words, the congestion level estimation unit 2084 calculates, for each priority class, the number of logical channels whose data have been discarded due to delay.

Calculations of the tenth number of mobile stations whose downlink data have been discarded due to delay are described above. The eleventh number of mobile stations whose uplink data have been discarded due to delay may be calculated in a similar manner.

For example, the congestion level estimation unit 2084 may be configured to receive information on discontinuity in uplink PDCP layer sequence numbers and to calculate the eleventh number of mobile stations whose uplink data have been discarded due to delay based on the received information. That is, the congestion level estimation unit 2084 assumes that the discontinuity in the sequence numbers is caused by discarding of data due to delay at the mobile stations and calculates the number of mobile stations whose data have been discarded due to delay based on the discontinuity in the sequence numbers.

More specifically, the congestion level estimation unit 2084 may be configured to measure, in a predetermined monitoring period, the number of mobile stations whose discontinuity in uplink PDCP layer sequence numbers is greater than or equal to a predetermined threshold and to use the measured number of mobile stations as the eleventh number of mobile stations.

Alternatively, the congestion level estimation unit 2084 may be configured to measure, in a predetermined monitoring period, the number of mobile stations whose amounts of discarded data, which are estimated based on the discontinuity in uplink PDCP layer sequence numbers, are greater than or equal to a predetermined threshold and to use the measured number of mobile stations as the eleventh number of mobile stations.

Also, the congestion level estimation unit 2084 may be configured to measure, in a predetermined monitoring period, the number of mobile stations whose ratios of discarded packet data to all the data, which are estimated based on the discontinuity in uplink PDCP layer sequence numbers, are greater than or equal to a predetermined threshold and to use the measured number of mobile stations as the eleventh number of mobile stations.

The congestion level estimation unit 2084 may be configured to calculate the eleventh number of mobile stations for each logical channel. In this case, the eleventh number of mobile stations is represented by the number of logical channels. In other words, the congestion level estimation unit 2084 calculates the number of logical channels whose data have been discarded due to delay.

The first through eleventh numbers of mobile stations described above may be calculated for each TTI (or subframe) or may be sampled at a predetermined time interval. Also, values obtained every TTI may be averaged over a predetermined averaging period and values sampled at the predetermined time interval may be averaged over a predetermined averaging period. The averaging period and the time interval for sampling may be set as parameters.

For example, each of the first through eleventh numbers of mobile stations may be represented by a filtered value $F_n$ obtained by calculating an average or a sum of measurements obtained in a predetermined time interval of, for example, 100 ms, and by filtering the average or the sum using a formula shown below.

$$F_n = (1-a) \times F_{n-1} + aM_n$$

$F_n$: current value obtained by filtering
$F_{n-1}$: previous value obtained by filtering
a: filtering factor
$M_n$: average or sum of measurements obtained in a predetermined time period of, for example, 100 ms For example, the filtering factor "a" may be set at $1/2^{(k/2)}$ (k=0, 1, 2, ... ). The predetermined time interval may be set at any appropriate value (e.g., 200 ms or 80 ms) other than 100 ms.

<Scheduling Based on Congestion Level>

Next, a scheduling method based on an estimated congestion level is described.

According to an embodiment of the present invention, priority of data is changed based on an estimated congestion level. In the scheduling method of this embodiment, a coefficient $C_n$ (n indicates an index of a user equipment) is calculated for each user equipment using formula 3 below, and radio resources for the shared channel are allocated to one or more user equipments (mobile stations) whose coefficients $C_n$ are the largest.

$$C_n = A_{Priority_n}(flag_{congestion}) \cdot \frac{Q_n}{\overline{R}_n} \qquad \text{[Formula 3]}$$

$Q_n$: Instantaneous channel quality $\overline{R}_n$: Average transmission rate $A_{priority_n}$: Priority level $flag_{congestion}$: Congestion level indicator (0: Not Congested; 1: Congested)

For downlink, $Q_n$ is calculated, for example, based on a downlink channel quality indicator (CQI) reported by the user equipment. For uplink, $Q_n$ is calculated, for example, based on the radio quality such as the signal-to-interference ratio (SIR) of a reference signal transmitted from the user equipment. Alternatively, $Q_n$ for uplink may be calculated based on the radio quality of a reference signal and a power offset between the reference signal and an uplink shared channel. In other words, the quality of an uplink shared channel estimated based on the radio quality of a reference signal and the power offset between the reference signal and the uplink shared channel may be used as the channel quality $Q_n$.

$$\overline{R}_n \qquad \text{[Formula 4]}$$

$\overline{R}_n$ indicates the average transmission rate of the user equipment. In calculating the average transmission rate, a period of time during which transmission data are present in the transmission buffer may be used as the denominator. Alternatively, the sum of a period of time during which transmission data are present in the transmission buffer and a period of time during which transmission data are not present in the transmission buffer may be used as the denominator.

$$\overline{R}_n \qquad \text{[Formula 5]}$$

For $\overline{R}_n$, an average of $Q_n$ may be used instead of the average transmission rate of the user equipment.

$A_{priority_n}$ indicates a priority level. As described above, the priority level $A_{priority_n}$ is changed based on an estimated congestion level.

For example, when the cell is not congested ($flag_{congestion}$=0), the priority level for low-priority data is set at $A_{priority_n}(0)=A_{low}(0)=1$ and the priority level for high-priority data is set at $A_{priority_n}(0)=A_{high}(0)=1$. Since it is assumed that sufficient radio resources are available when the cell is not congested, the same priority level is assigned to the low-priority data and the high-priority data for scheduling. Meanwhile, when the cell is congested ($flag_{congestion}$=1), the priority level for low-priority data is set at $A_{priority_n}(1)=A_{low}(1)=1$ and the priority level for high-priority data is set at $A_{priority_n}(1)=A_{high}(1)=10$. Since it is assumed that radio resources are tight when the cell is congested, different priority levels are assigned to the low-priority data and the high-priority data for scheduling.

In another example, when the cell is not congested ($flag_{congestion}$=0), the priority level for low-priority data is set at $A_{priority_n}(0)=A_{low}(0)=1$ and the priority level for high-priority data is set at $A_{priority_n}(0)=A_{high}(0)=2$. That is, when the cell is not congested, the difference between priority levels assigned to the low-priority data and the high-priority data for scheduling is set at a relatively small value. Meanwhile, when the cell is congested ($flag_{congestion}$=1), the priority level for low-priority data is set at $A_{priority_n}(1)=A_{low}(1)=1$ and the priority level for high-priority data is set at $A_{priority_n}(1)=A_{high}(1)=10$. That is, when the cell is congested, the difference between priority levels assigned to the low-priority data and the high-priority data for scheduling is set at a relatively large value.

The above values of $A_{priority_n}$ are just examples used for descriptive purposes. $A_{priority_n}$ for high-priority data and low-priority data may be set at any values as long as the value of $A_{priority_n}$ for the high-priority data increases as the congestion level increases. In the above examples, only two congestion levels (congested and not congested) are used. However, the number of congestion levels may be three or more. Also in the above examples, only two priority levels (low and high) are used. However, the number of priority levels may be three or more.

As a variation of the scheduling method of this embodiment, a coefficient $C_n$ (n indicates an index of a user equipment) may be calculated for each user equipment using formula 6 below, and radio resources for the shared channel may be allocated to one or more user equipments whose coefficients $C_n$ are the largest.

$$C_n = \frac{Q_n}{\overline{R}_n - R_{target,priority_n}(flag_{congestion})} \qquad \text{[Formula 6]}$$

$$\overline{R}_n \qquad \text{[Formula 7]}$$

Parameters $Q_n$, $\overline{R}_n$, and $flag_{congestion}$ in formula 6 are the same as those in formula 3, and therefore their descriptions are omitted here. $R_{target,priority,n}(flag_{congestion})$ indicates a desired minimum transmission rate and is determined, for example, based on the priority level. Effects of parameter $R_{target,priority,n}(flag_{congestion})$ are described below. Let us assume that $R_{target,priority,n}$ $flag_{congestion}$) is set at 64 kbps.

$$\overline{R}_n \qquad \text{[Formula 8]}$$

In this case, if $\overline{R}_n$ changes from a value greater than 64 kbps and to a value closer to 64 kbps, the denominator of formula 6 becomes closer to 0 and the value of $O_n$ increases. This means that the probability that radio resources are allocated to the user equipment increases. As another example, let us assume that $R_{target,priority,n}(flag_{congestion})$ is set at 640 kbps.

$$\overline{R}_n \qquad \text{[Formula 9]}$$

In this case, if $\overline{R}_n$ changes from a value greater than 640 kbps and to a value closer to 640 kbps, the denominator of formula 6 becomes closer to 0 and the value of $C_n$ increases. This means that the probability that radio resources are allocated to the user equipment increases. In the former example, the probability that radio resources are allocated to the user equipment does not increase until the average transmission rate becomes close to 64 kbps. Meanwhile, in the latter example, the probability that radio resources are allocated to the user equipment increases when the average transmission rate becomes close to 640 kbps. In other words, the user equipment in the latter example is given priority over the user equipment in the former example. Accordingly, like $A_{priority,n}$ in formula 3, $R_{target,priority,n}(flag_{congestion})$ is also an indicator of the priority level. However, $R_{target,priority,n}(flag_{congestion})$ is different from $A_{priority,n}$ in that the probability that radio resources are allocated to the user equipment increases when the average transmission rate of the user equipment becomes close to the desired minimum transmission rate.

For example, when the cell is not congested ($flag_{congestion}=0$), the priority level for low-priority data is set at $R_{target,priority,n}(0)=R_{target,low,n}(0)=64$ kbps and the priority level for high-priority data is set at $R_{target,priority,n}(0)=R_{target,high,n}(0)=64$ kbps. Since it is assumed that sufficient radio resources are available when the cell is not congested, the same priority level is assigned to the low-priority data and the high-priority data for scheduling. Meanwhile, when the cell is congested ($flag_{congestion}=1$), the priority level for low-priority data is set at $R_{target,priority,n}(0)=R_{target,low,n}(0)=0$ kbps and the priority level for high-priority data is set at $R_{target,priority,n}(0)=R_{target,high,n}(0)=100$ kbps. Since it is assumed that radio resources are tight when the cell is congested, different priority levels are assigned to the low-priority data and the high-priority data for scheduling.

In another example, when the cell is not congested ($flag_{congestion}=0$), the priority level for low-priority data is set at $R_{target,priority,n}(0)=R_{target,low,n}(0)=64$ kbps and the priority level for high-priority data is set at $R_{target,priority,n}(0)=R_{target,high,n}(0)=128$ kbps. That is, when the cell is not congested, the difference between priority levels assigned to the low-priority data and the high-priority data for scheduling is set at a relatively small value. Meanwhile, when the cell is congested ($flag_{congestion}=1$), the priority level for low-priority data is set at $R_{target,priority,n}(1)=R_{target,low,n}(1)=0$ kbps and the priority level for high-priority data is set at $R_{target,priority,n}(1)=R_{target,high,n}(1)=384$ kbps. That is, when the cell is congested, the difference between priority levels assigned to the low-priority data and the high-priority data for scheduling is set at a relatively large value.

The above values of $R_{target,priority}$ are just examples used for descriptive purposes. $R_{target,priority}$ for high-priority data and low-priority data may be set at any values as long as the value of $R_{target,priority}$ for the high-priority data increases as the congestion level increases. In the above examples, only two congestion levels (congested and not congested) are used. However, the number of congestion levels may be three or more. Also in the above examples, only two priority levels (low and high) are used. However, the number of priority levels may be three or more.

As another variation of the scheduling method of this embodiment, a coefficient $C_n$ (n indicates an index of a user equipment) may be calculated for each user equipment using formula 10 below, and radio resources for the shared channel may be allocated to one or more user equipments whose coefficients $C_n$ are the largest.

$$C_n = A_{priority_n}(flag_{congestion}) \cdot \frac{Q_n}{\overline{R}_n - R_{target,priority_n}(flag_{congestion})}$$ [Formula 10]

$$\overline{R}_n$$ [Formula 11]

Also, the coefficient $C_n$ may be calculated for each user equipment or for each logical channel of the user equipment. When the coefficient $C_n$ is calculated for each logical channel, $\overline{R}_n$ and are calculated for each logical channel, and $A_{priority,n}$ or $R_{target,priority,n}$ is also set for each logical channel.

Figure 7:
FIG. 7 is a flowchart showing a communication control method according to an embodiment of the present invention.

FIG. 7 is a flowchart showing a communication control method according to an embodiment of the present invention.

As shown in FIG. 7, the base station 200 obtains the channel quality information $Q_n$ (step S101). For downlink, $Q_n$ is calculated, for example, based on a downlink channel quality indicator (CQI) reported by the user equipment. For uplink, $Q_n$ is calculated, for example, based on the radio quality such as the signal-to-interference ratio (SIR) of a reference signal transmitted from the user equipment. Alternatively, $Q_n$ for uplink may be calculated based on the radio quality of a reference signal and a power offset between the reference signal and an uplink shared channel. Next, the base station 200 obtains the average transmission rate (step S103). Also, the base station 200 obtains the congestion level of the cell as described above with reference to FIGS. 2 through 6 (step S105). In step S107, the base station 200 compares the obtained congestion level with a threshold and determines whether the cell is congested. If the cell is not congested (NO in step S107), the base station 200 sets priority levels for low-priority data and high-priority data such that the difference between them becomes relatively small (step S109). Alternatively, the base station 200 may set the same priority level for the low-priority data and the high-priority data. Meanwhile, if the cell is congested (YES in step S107), the base station 200 sets priority levels for the low-priority data and the high-priority data such that the difference between them becomes relatively large (step S111). Then, the base station 200 calculates the scheduling coefficient $C_n$ based on the set priority levels (step S113). The scheduling coefficient $C_n$ is calculated, for example, using formula described above, and is used to determine user equipments to which radio resources are to be allocated.

Figure 8:
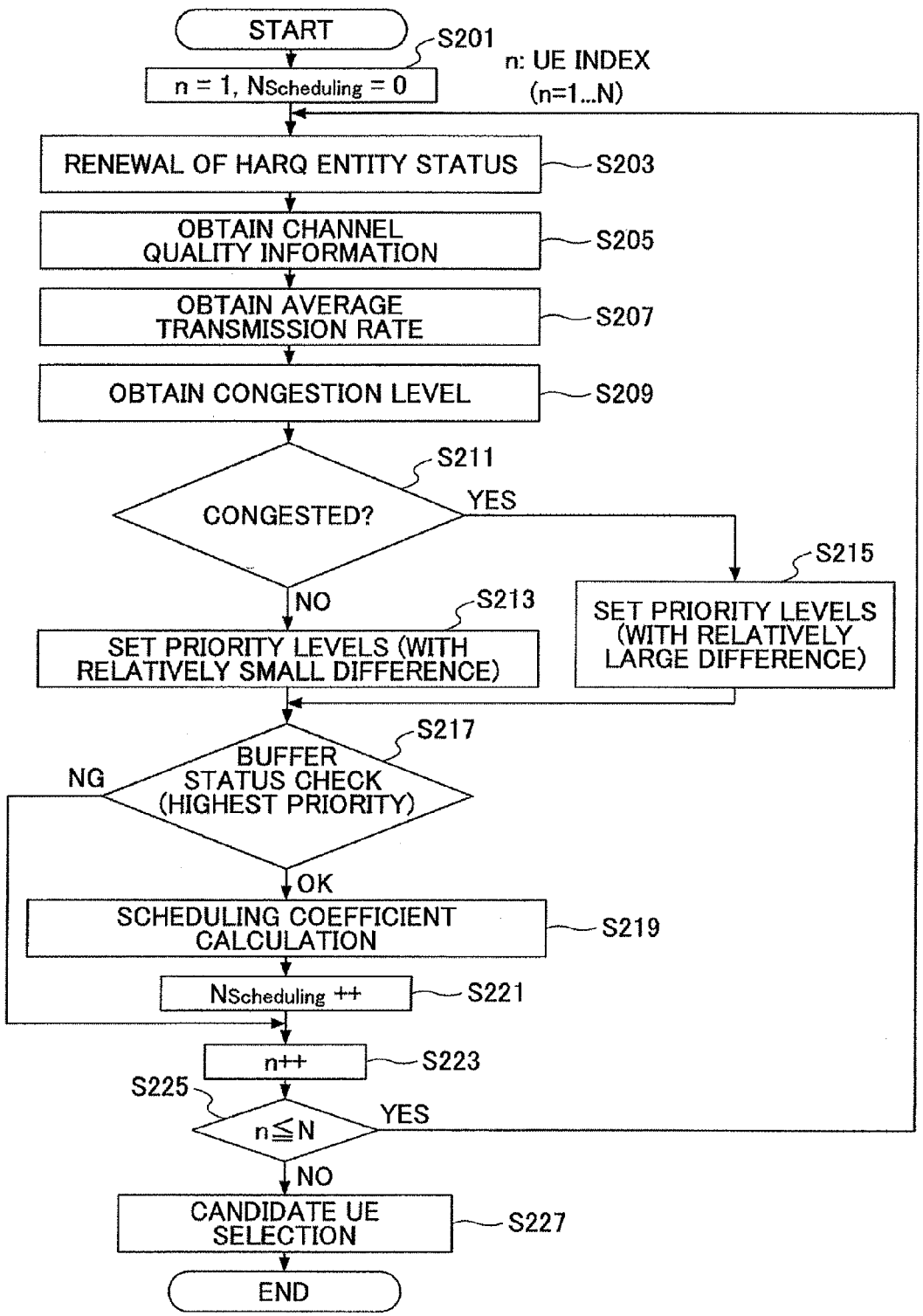
FIG. 8 is a flowchart showing a downlink communication control method according to an embodiment of the present invention.

FIG. 8 is a flowchart showing a downlink scheduling process employing the communication control method shown in FIG. 7.

The base station 200 performs the process described below for all user equipments (UE) that are in the LTE Active state (for example, user equipments in the RRC (radio resource control) connected state).

First, the base station 200 sets n=1 and $N_{scheduling}=0$ (step S201). Here, n indicates the index of a user equipment $100_n$ (n=1, N; N>0).

Next, the base station 200 performs renewal of a hybrid automatic repeat request (HARQ) entity status (step S203). More specifically, the base station 200 releases a process that has received ACK (acknowledgement information) for the downlink shared channel from the corresponding user equipment. The base station 200 also releases a process that has reached the maximum number of retransmission attempts and discards user data in the process.

Steps S205 through S215 correspond to steps S101 through S111 of FIG. 7. In the downlink scheduling process of FIG. 8, the base station 200 calculates the channel quality information based on a downlink channel quality indicator (CQI) reported by the user equipment (step S205).

Next, the base station 200 performs a buffer status check (step S217). Specifically, the base station 200 determines, for each logical channel of the user equipment, whether there are data that can be transmitted in the subframe. In other words, the base station 200 determines, for each logical channel of the user equipment, whether transmittable data are present in the data buffer. If transmittable data are not present for any of the logical channels, the base station 200 returns NG; and if transmittable data are present for at least one logical channel, the base station returns OK. Here, transmittable data indicate either data to be transmitted a first time or data to be retransmitted.

If the result of the buffer status check is NG (NG in step S217), the base station 200 excludes the user equipment from candidates for scheduling. If the result of the buffer status check is OK (OK in step S217), the base station 200 calculates a scheduling coefficient for the user equipment (scheduling coefficient calculation) (step S219).

In step S219, the base station 200 calculates the scheduling coefficient using formula 12 shown below.

$$C_n = A_{Priority_n}(flag_{congestion}) \cdot \frac{Q_n}{\overline{R}_n} \quad \text{[Formula 12]}$$

$Q_n$: Instantaneous channel quality $\overline{R}_n$: Average transmission rate $A_{priority_n}$: Priority level $flag_{congestion}$: Congestion level indicator (0: Not Congested; 1: Congested)

Next, the base station 200 increases $N_{scheduling}$, which indicates the number of user equipments for which scheduling coefficients have been calculated, by 1 (step S221), and increases "n" indicating the user equipment index by 1 (step S223).

The base station 200 determines whether "n" is less than or equal to N (step S225). If "n" is less than or equal to N (YES in step S225), the base station 200 returns to step S203.

Meanwhile, if "n" is greater than N (NO in step S225), the base station 200 selects user equipments in step S227 (candidate UE selection). That is, the base station 200 selects user equipments to which radio resources in the subframe are to be allocated by dynamic scheduling. More specifically, the base station 200 selects user equipments to which radio resources are to be allocated by dynamic scheduling in descending order of the scheduling coefficients calculated in step S219. In other words, the base station 200 selects user equipments as destinations of the downlink shared channel to which dynamic scheduling is applied.

Figure 9:
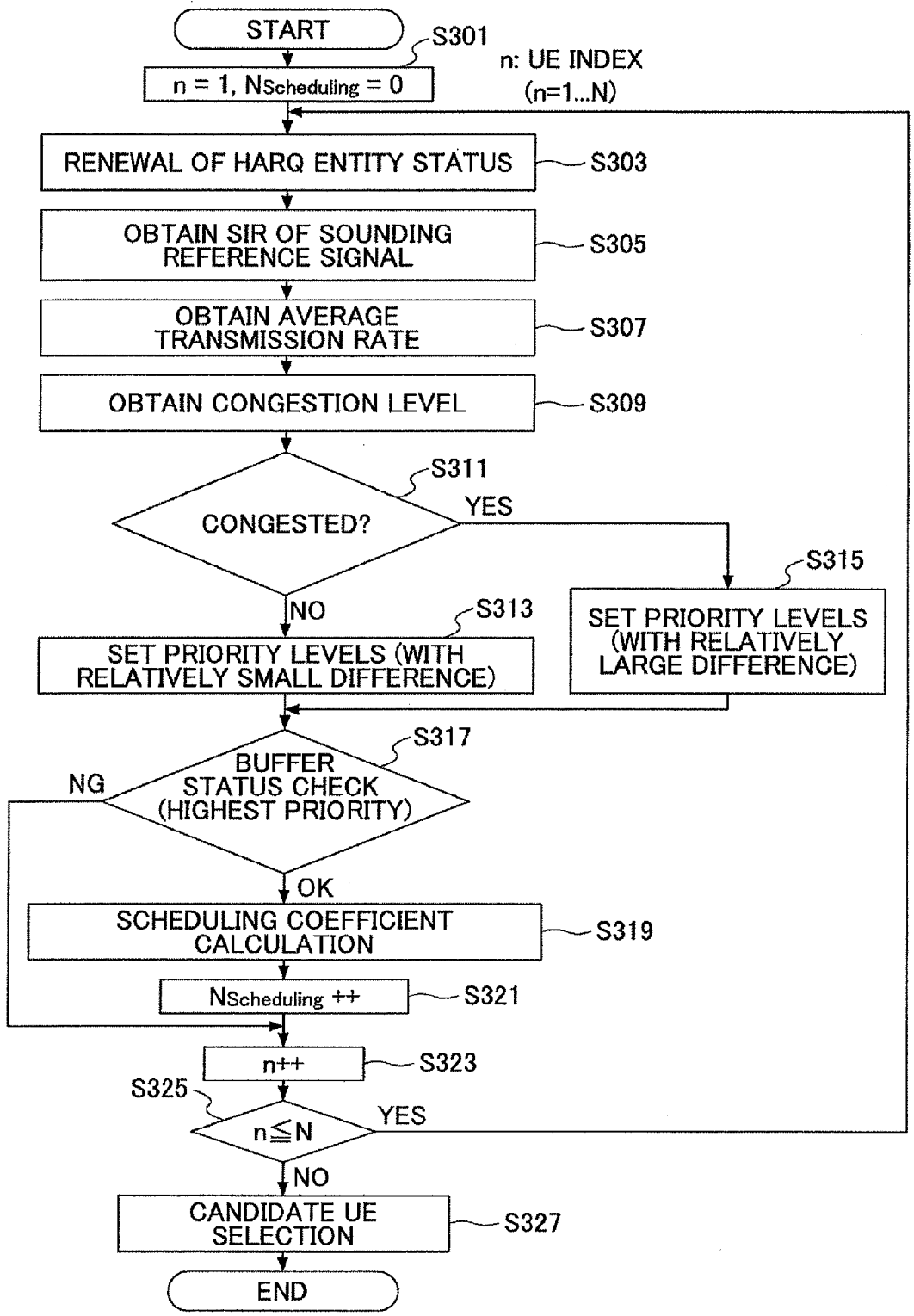
FIG. 9 is a flowchart showing an uplink communication control method according to an embodiment of the present invention.

FIG. 9 is a flowchart showing an uplink scheduling process employing the communication control method shown in FIG. 7.

The base station 200 performs the process described below for all user equipments that are in the LTE Active state (for example, user equipments in the RRC connected state).

First, the base station 200 sets n=1 and $N_{scheduling}$=0 (step S301). Here, n indicates the index of a user equipment 100$_n$ (n=1, N; N>0).

Next, the base station 200 performs renewal of the HARQ (hybrid automatic repeat request) entity status (step S303). More specifically, the base station 200 releases a process for the user equipment if the result of cyclic redundancy check (CRC) on the UL-SCH is OK. The base station 200 also releases a process that has reached the maximum number of retransmission attempts and discards user data in the process. Here, it is assumed that the maximum number of retransmission attempts is set for each user equipment.

Steps S305 through S315 correspond to steps S101 through S111 of FIG. 7. In the uplink scheduling process of FIG. 9, the base station 200 calculates the channel quality information based on the radio quality, such as the signal-to-interference ratio, of a reference signal transmitted from the user equipment (step S305).

Next, the base station 200 performs the buffer status check (step S317). This is to determine a user equipment having no data to be transmitted. If a user equipment does not have data to be transmitted, the base station 200 does not assign the uplink shared channel to the user equipment. Specifically, the base station 200 determines, for each logical channel group (logical channel group #1, logical channel group #2, logical channel group #3, and logical channel group #4) of the user equipment, whether there are data that can be transmitted in the subframe. If transmittable data are not present for any of the logical channel groups, the base station 200 returns NG; and if transmittable data are present for at least one logical channel group, the base station returns OK. Here, transmittable data indicate data to be transmitted the first time.

If the result of the buffer status check is OK (OK in step S317), the base station 200 excludes the user equipment from candidates for scheduling for initial transmission. This indicates that the scheduling coefficient is not calculated for the user equipment in step S319 described later and the scheduling for initial transmission is not performed for the user equipment.

If the result of the buffer status check is OK (OK in step S317), the base station 200 calculates a scheduling coefficient for the user equipment (scheduling coefficient calculation) (step S319).

In step S319, the base station 200 calculates the scheduling coefficient using formula 13 shown below.

$$C_n = A_{Priority_n}(flag_{congestion}) \cdot \frac{Q_n}{\overline{R}_n} \quad \text{[Formula 13]}$$

$Q_n$: Instantaneous channel quality $\overline{R}_n$: Average transmission rate $A_{priority_n}$: Priority level $flag_{congestion}$: Congestion level indicator (0: Not Congested; 1: Congested)

Next, the base station 200 increases $N_{Scheduling}$, which indicates the number of user equipments for which scheduling coefficients have been calculated, by 1 (step S321), and increases "n" indicating the user equipment index by 1 (step S323).

The base station 200 determines whether "n" is less than or equal to N (step S325). If "n" is less than or equal to N (YES in step S325), the base station 200 returns to step S303.

Meanwhile, if "n" is greater than N (NO in step S325), the base station selects user equipments in step S327 (candidate UE selection). That is, the base station 200 selects user equipments to which radio resources in the subframe are to be allocated by dynamic scheduling. More specifically, the base station 200 selects user equipments to which radio resources are to be allocated by dynamic scheduling in descending order of the scheduling coefficients calculated in step S319. In other words, the base station 200 selects user equipments as destinations of the uplink shared channel to which dynamic scheduling is applied.

<Configuration of Base Station>

Next, the base station 200 that performs downlink scheduling according to an embodiment of the present invention is described with reference to FIG. 10.

The base station 200 of this embodiment includes a layer 1 processing unit 252, a user equipment status management unit 254, a congestion level estimation unit 256, a priority setting unit 258, a scheduling coefficient calculation unit 260, a UE selection unit 262, a frequency resource management unit 264, a transport format and resource block (TFR) selection unit 268, HARQ control units 270 ($270_1$, $270_2$, ..., $270_n$), and an RLC/PDCP processing unit 272. The HARQ control units 270 includes an HARQ control unit $270_1$, an HARQ control unit $270_2$, ..., and an HARQ control unit $270_n$ for UE#1, UE#2, ..., and UE#n. The RLC/PDCP processing unit 272 includes an RLC Buf $2721_{1,1}$, an RLC Buf $2721_{1,2}$, ..., an RLC Buf $2721_{1,k}$, an RLC Buf $2721_{2,1}$, ..., and an RLC Buf $2721_{n,k}$ for a logical channel #1 of UE#1, a logical channel #2 of UE#1, ..., a logical channel #k of UE#1, a logical channel #1 of UE#2, ..., and a logical channel #k of UE#n.

Figure 10:
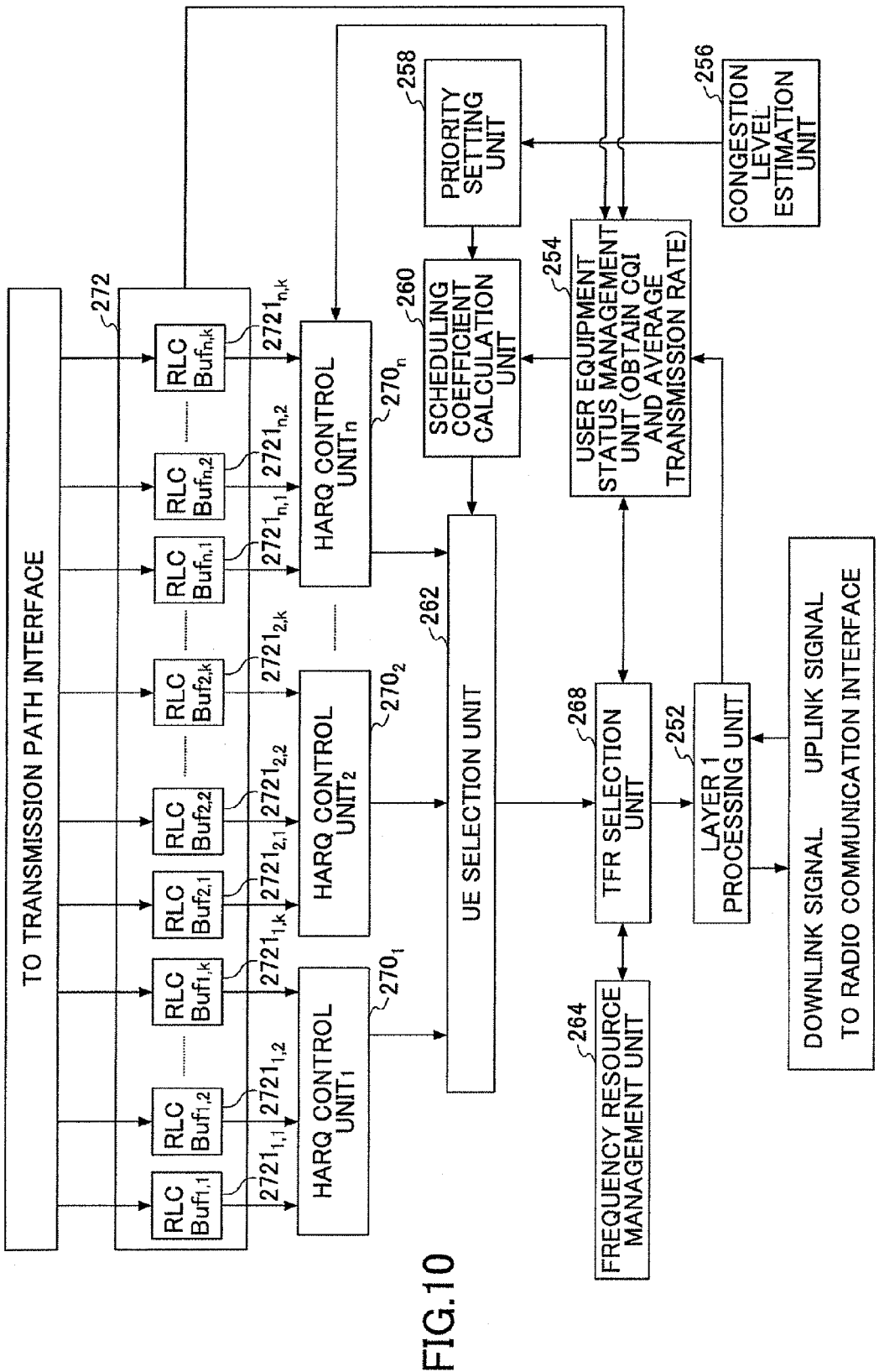
FIG. 10 is a partial block diagram of a base station according to an embodiment of the present invention.

The frequency resource management unit 264 of FIG. 10 corresponds to the call processing unit 210 of FIG. 3. The user equipment status management unit 254, the priority setting unit 258, the scheduling coefficient calculation unit 260, the UE selection unit 262, the TFR selection unit 268, and the HARQ control units 270 correspond to the MAC processing unit 2082 of FIG. 4. The RLC/PDCP processing unit 272 of FIG. 10 corresponds to the RLC/PDCP processing unit 2083 of FIG. 4.

In FIG. 10, the HARQ control units 270 are provided for respective user equipments (UE#1 through UE#n). Alternatively, one HARQ control unit 270 may be provided for all user equipments or each group of user equipments. Also in FIG. 10, the RLC Bufs 2721 are provided for respective logical channels. Alternatively, one RLC Buf 2721 may be provided for each user equipment or all user equipments.

The layer 1 processing unit 252 performs processing related to layer 1. More specifically, the layer 1 processing unit 252 performs channel coding and IFFT processing on the downlink shared channel and performs reception processing such as FFT processing, IDFT processing, and channel decoding on the uplink shared channel.

The layer 1 processing unit 252 also performs transmission processing for downlink scheduling information that is control information for the downlink shared channel and a UL scheduling grant that is control information for the uplink shared channel.

Also, the layer 1 processing unit 252 performs reception processing for uplink control information such as a channel quality indicator (CQI) and acknowledgement information for the downlink shared channel. The CQI and the acknowledgement information are sent to the user equipment status management unit 254.

Also, the layer 1 processing unit 252 determines an uplink synchronization state based on a sounding reference signal transmitted via uplink and a signal of the CQI and reports the result to the user equipment status management unit 254.

The layer 1 processing unit 252 may also be configured to estimate uplink reception timing based on a sounding reference signal transmitted via uplink and a signal of the CQI.

The layer 1 processing unit 252 is connected to a radio communication interface. In downlink, a baseband signal generated by the layer 1 processing unit 252 is converted into a radio frequency signal, and the radio frequency signal is amplified by an amplifier and transmitted via an antenna to the user equipment. In uplink, a radio frequency signal received by an antenna is amplified by an amplifier and frequency-converted into a baseband signal, and the baseband signal is input to the layer 1 processing unit 252.

The user equipment status management unit 254 manages the status of each user equipment. For example, the user equipment status management unit 254 manages the HARQ entity status, manages and controls the mobility of the user equipment, manages the DRX mode, manages the uplink synchronization state, manages whether to apply persistent scheduling, manages whether the MAC control block has been transmitted, manages the downlink transmission status, and manages the buffer status. In addition, the user equipment status management unit 254 calculates metrics used for calculation of the scheduling coefficient in step S219 of FIG. 8 and determines whether to calculate the scheduling coefficient. In other words, the user equipment status management unit 254 performs steps S203 through S217 of FIG. 8.

As described with reference to FIGS. 2 through 6, the congestion level estimation unit 256 estimates the congestion level of the cell.

The priority level setting unit 258 determines priority levels of downlink data based on the congestion level estimated by the congestion level estimation unit 256. More specifically, the priority level setting unit 258 sets the priority levels for low-priority data and high-priority data such that the difference between them becomes relatively small if the cell is not congested, and sets the priority levels for low-priority data and high-priority data such that the difference between them becomes relatively large if the cell is congested.

The scheduling coefficient calculation unit 260 performs steps S219 through S227 of FIG. 8.

Specifically, the scheduling coefficient calculation unit 260 calculates scheduling coefficients of user equipments for a subframe (see formula 6). Based on the scheduling coefficients, the UE selection unit 262 selects user equipments to which radio resources are to be allocated by dynamic scheduling. Then, the UE selection unit 262 inputs the number of user equipments to which radio resources are to be allocated by dynamic scheduling to the TFR selection unit 268.

The TFR selection unit 268 determines transport formats and allocation of radio resources for the DL-SCH to which dynamic scheduling is applied. Information on the transport formats and the radio resources determined by the TFR selection unit 268 is sent to the layer 1 processing unit 252 and is used at the layer 1 processing unit 252 for the transmission processing of the DL scheduling information and the transmission processing of the downlink shared channel.

The frequency resource management unit 264 is connected to the TFR selection unit 268 and manages frequency resources. Specifically, the frequency resource management unit 264 monitors the frequency resources available for the downlink shared channel to which dynamic scheduling is applied and provides the TFR selection unit 268 with information necessary for the processing at the TFR selection unit 268.

The HARQ control units 270 controls HARQ for the corresponding user equipments.

The RLC/PDCP processing unit 272 controls the RLC layer and the PDCP layer of respective user equipments. Also, the RLC/PDCP processing unit 272 includes the RLC Bufs (RLC buffers) $2721_{n,1}$-$2721_{n,k}$ for the logical channels #1-#k of respective user equipments (UE#1-UE#n) to buffer downlink transmission data in the RLC layer.

Although the RLC Bufs 2721 buffer data in the RLC layer in the above example, the RLC Bufs 2721 may be configured to buffer data in the RLC layer and the PDCP layer.

Data to be transmitted via the downlink shared channel in a subframe are extracted from the RLC Bufs 2721 by the RLC/PDCP processing unit 272 and HARQ processing is performed on the extracted data by the HARQ control units 270. The data are then sent via the UE selection unit 262 and the TFR selection unit 268 to the layer 1 processing unit 252 and the layer 1 processing unit 252 performs transmission processing such as encoding and IFFT on the data.

Next, the base station 200 that performs uplink scheduling according to an embodiment of the present invention is described with reference to FIG. 11.

The base station 200 of this embodiment includes a layer 1 processing unit 252, a user equipment status management unit 254, a congestion level estimation unit 256, a priority setting unit 258, a scheduling coefficient calculation unit 260, a UE selection unit 262, a frequency resource management unit 264, a TFR selection unit 268, and a UE buffer estimation unit 280. The UE buffer estimation unit 280 includes a UE Buf $2801_{1,1}$ a UE Buf $2801_{1,2}$ ..., a UE Buf $2801_{1,k}$, a UE Buf $2801_{2,1}$ ..., and a UE Buf $2801_{n,k}$ for a logical channel group #1 of UE#1, a logical channel group #2 of UE#1, a logical channel group #k of UE#1, a logical channel group #1 of UE#2, and a logical channel group #k of UE#n. The UE Bufs 2801 do not actually buffer data, but estimate the amounts of data in the buffers of the corresponding user equipments (UE#1-UE#n) based of buffer status reports from the user equipments.

Figure 2:
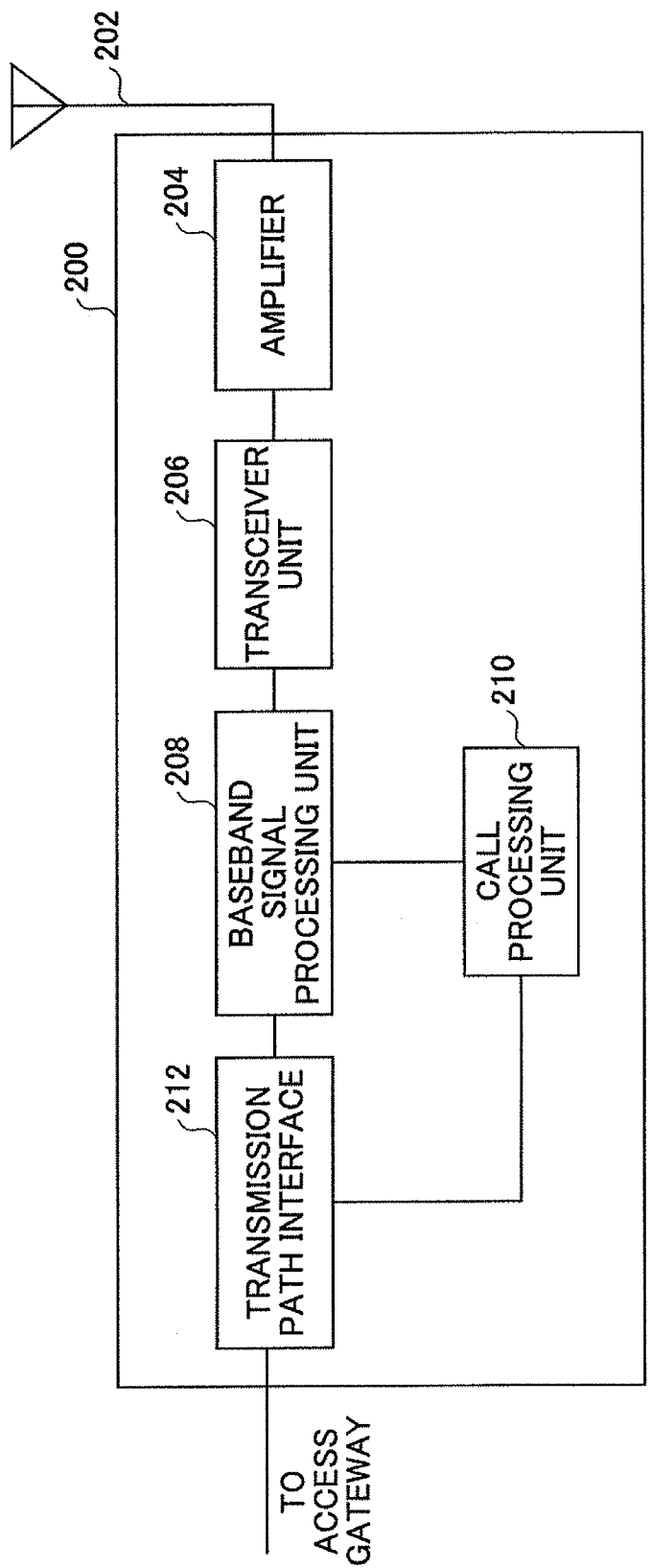
FIG. 2 is a partial block diagram of a base station according to an embodiment of the present invention.
Figure 11:
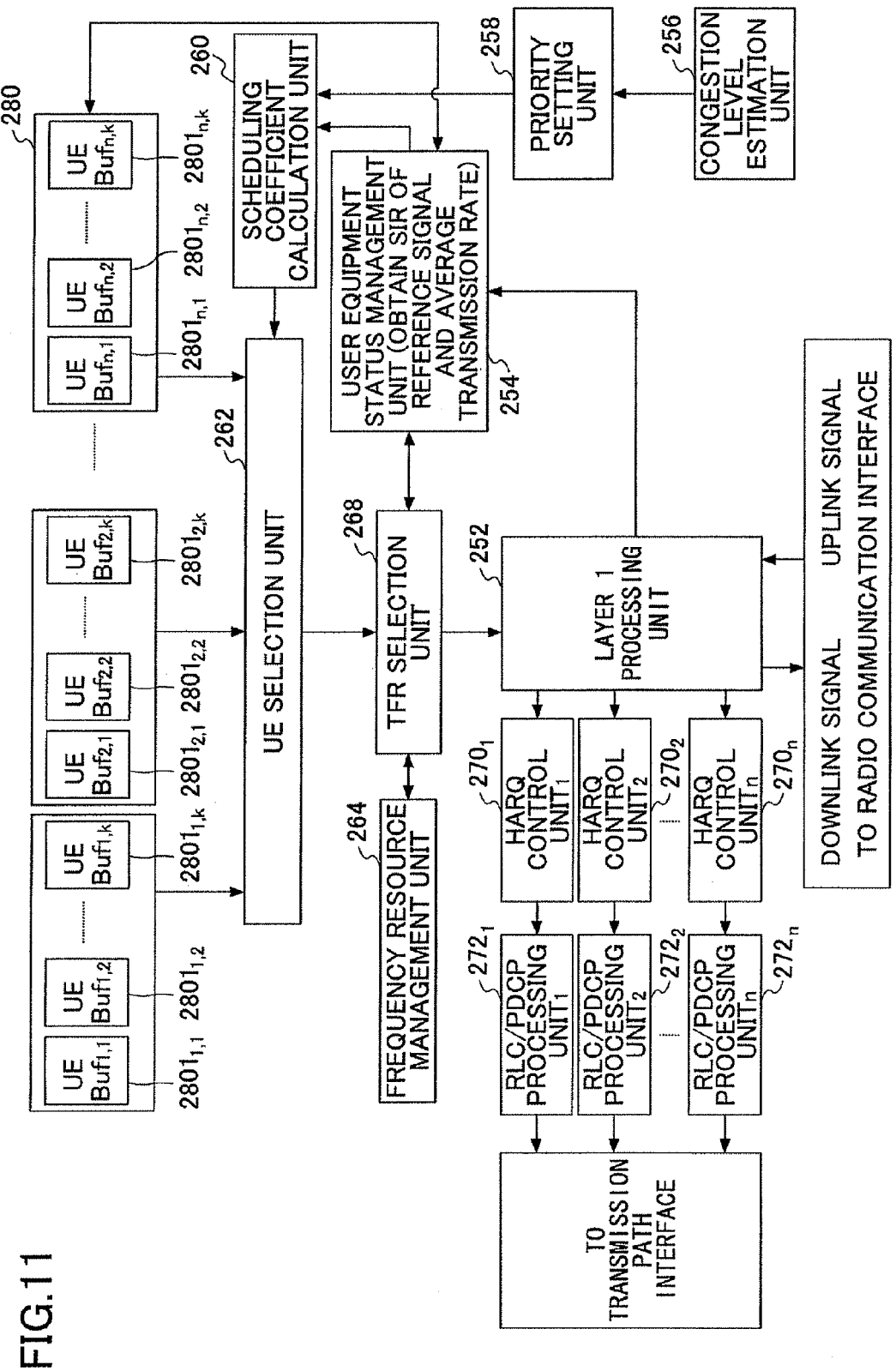
FIG. 11 is a partial block diagram of a base station according to an embodiment of the present invention.

The frequency resource management unit 264 of FIG. 11 corresponds to the call processing unit 210 of FIG. 2. The user equipment status management unit 254, the priority setting unit 258, the scheduling coefficient calculation unit 260, the UE selection unit 262, and the TFR selection unit 268 correspond to the MAC processing unit 2082 of FIG. 4.

In FIG. 11, the UE Bufs 2801 are provided for respective logical channel groups #1 through #k of each user equipment (UE#1-UE#n). Alternatively, one UE Buf 2801 may be provided for all user equipments or each group of user equipments.

Also, instead of providing the UE Bufs 2801 for respective logical channels, one UE Buf 2801 may be provided for each user equipment. The layer 1 processing unit 252 performs processing related to layer 1. More specifically, the layer 1 processing unit 252 performs channel coding and IFFT processing on the downlink shared channel and performs reception processing such as FFT processing, IDFT processing, and channel decoding on the uplink shared channel.

The layer 1 processing unit 252 also performs transmission processing for downlink scheduling information that is control information for the downlink shared channel and UL scheduling grant that is control information for the uplink shared channel.

Also, the layer 1 processing unit 252 performs reception processing for uplink control information such as a channel quality indicator (CQI) and acknowledgement information for the downlink shared channel. The CQI and the acknowledgement information are sent to the user equipment status management unit 254.

Also, the layer 1 processing unit 252 determines an uplink synchronization state based on a sounding reference signal transmitted via uplink and the signal of the CQI and reports the result to the user equipment status management unit 254. Also, the layer 1 processing unit 252 measures the SIR of a sounding reference signal transmitted via uplink and reports the measurement to the user equipment status management unit 254. The SIR of the sounding reference signal is used, for example, in step S319 of FIG. 9.

The layer 1 processing unit 252 may also be configured to estimate uplink reception timing based on a sounding reference signal transmitted via uplink and the signal of the CQI.

The layer 1 processing unit 252 is connected to a radio communication interface. In downlink, a baseband signal generated by the layer 1 processing unit 252 is converted into a radio frequency signal, and the radio frequency signal is amplified by an amplifier and transmitted via an antenna to the user equipment. In uplink, a radio frequency signal received by an antenna is amplified by an amplifier and frequency-converted into a baseband signal, and the baseband signal is input to the layer 1 processing unit 252.

The user equipment status management unit 254 manages the status of each user equipment. For example, the user equipment status management unit 254 manages the uplink HARQ entity status, manages and controls the mobility of the user equipment, manages the DRX mode, manages the uplink synchronization state, manages whether to apply persistent scheduling, manages whether the MAC control block has been transmitted, manages the transmission status, and estimates the buffer status of the user equipment. In addition, the user equipment status management unit 254 calculates metrics used for calculation of the scheduling coefficient in step S319 of FIG. 9 and determines whether to calculate the scheduling coefficient. In other words, the user equipment status management unit 254 performs steps S303 through S317 of FIG. 9.

As described with reference to FIGS. 2 through 6, the congestion level estimation unit 256 estimates the congestion level of the cell.

The priority level setting unit 258 determines priority levels of uplink data based on the congestion level estimated by the congestion level estimation unit 256. More specifically, the priority level setting unit 258 sets priority levels for low-priority data and high-priority data such that the difference between them becomes relatively small if the cell is not congested, and sets the priority levels for low-priority data and high-priority data such that the difference between them becomes relatively large if the cell is congested.

The scheduling coefficient calculation unit 260 performs steps S319 through S327 of FIG. 9. Specifically, the scheduling coefficient calculation unit 260 calculates scheduling coefficients of user equipments for a subframe (see formula 10). Based on the scheduling coefficients, the UE selection unit 262 selects user equipments to which radio resources are to be allocated by dynamic scheduling. Then, the UE selection unit 262 inputs the number of user equipments to which radio resources are to be allocated by dynamic scheduling to the TFR selection unit 268.

The TFR selection unit 268 determines transport formats and allocation of radio resources for the UL-SCH to which dynamic scheduling is applied and performs uplink transmission power control. Information on the transport formats and the radio resources determined by the TFR selection unit 268 is sent to the layer 1 processing unit 252 and is used at the layer 1 processing unit 252 for the transmission processing of the UL scheduling information and the reception processing of the uplink shared channel.

The frequency resource management unit 264 is connected to the TFR selection unit 268 and manages frequency resources. Specifically, the frequency resource management unit 264 monitors frequency resources available for the uplink shared channel to which dynamic scheduling is applied and provides the TFR selection unit 268 with information necessary for the processing at the TFR selection unit 268.

The UE buffer estimation unit 280 estimates the buffer status, i.e., the amount of buffered data, for each logical channel group of the user equipment based on the buffer status report reported by the user equipment.

In the above embodiments, it is assumed that the radio communication system 1000 is based on Evolved UTRA and UTRAN (also called Long Term Evolution or Super 3G). However, a base station and a communication control method according to the present invention may be used for any system using shared channels for communications.

In the above embodiments, the number of logical channels is calculated. Alternatively, logical channels may be divided into groups (logical channel groups) and the number of logical channel groups may be calculated.

The present invention is not limited to the specifically disclosed embodiments, and variations and modifications may be made without departing from the scope of the present invention. Although specific values are used in the above descriptions to facilitate the understanding of the present invention, the values are just examples and different values may also be used unless otherwise mentioned. Although functional block diagrams are used to describe apparatuses in the above embodiments, the apparatuses may be implemented by hardware, software, or a combination of them.

The present international application claims priority from Japanese Patent Application No. 2008-071637 filed on Mar. 19, 2008, the entire contents of which are hereby incorporated herein by reference.

The invention claimed is:

1. A base station communicating with user equipments using shared channels, the base station comprising:
   a congestion level estimation unit estimating a congestion level of a cell;
   a priority-level/desired-value changing unit changing priority levels or desired minimum transmission rates of data to be transmitted by the user equipments or the base station based on the congestion level of the cell; and
   a selection unit selecting one or more of the user equipments to which radio resources are to be allocated based on the changed priority levels or the changed desired minimum transmission rates of the data.

2. The base station as claimed in claim 1, wherein the selection unit selects one or more of the user equipments to which downlink radio resources are to be allocated based also on at least one of channel quality information reported by the user equipments and average transmission rates of the user equipments.

3. The base station as claimed in claim 1, wherein the selection unit selects one or more of the user equipments to which uplink radio resources are to be allocated based also on at least one of radio quality of reference signals transmitted from the user equipments and average transmission rates of the user equipments.

4. The base station as claimed in claim 1, wherein the congestion level estimation unit estimates the congestion level of the cell based on at least one of a number of the user equipments or a number of logical channels of the user equipments for which data to be transmitted are present in downlink transmission buffers;
a number of the user equipments or a number of logical channels of the user equipments for which data to be transmitted are present in uplink transmission buffers;
a number of the user equipments communicating frequently using the shared channels;
a number of the user equipments communicating infrequently using the shared channels;
a number of the user equipments in a connected state in the cell;
a number of the user equipments or a number of logical channels of the user equipments whose downlink transmission rates are less than a predetermined threshold;
a number of the user equipments or a number of logical channels of the user equipments whose uplink transmission rates are less than a predetermined threshold;
a number of the user equipments or a number of logical channels of the user equipments whose buffering time of downlink data is greater than a predetermined threshold;
a number of the user equipments or a number of logical channels of the user equipments whose buffering time of uplink data is greater than a predetermined threshold;
a number of the user equipments or a number of logical channels of the user equipments whose downlink data have been discarded due to delay;
a number of the user equipments or a number of logical channels of the user equipments whose uplink data have been discarded due to delay;
a processing load of the base station; and
a processing load of another node.

5. The base station as claimed in claim 4, wherein the transmission rates are calculated in a period of time during which data to be transmitted are present in a transmission buffer.

6. A communication control method performed by a base station communicating with user equipments using shared channels, the method comprising the steps of:
   estimating a congestion level of a cell;
   changing priority levels or desired minimum transmission rates of data to be transmitted by the user equipments or the base station based on the congestion level of the cell; and
   selecting one or more of the user equipments to which radio resources are to be allocated based on the changed priority levels or the changed desired minimum transmission rates of the data.

* * * * *